US010636014B2

(12) United States Patent
Cannons

(10) Patent No.: US 10,636,014 B2
(45) Date of Patent: Apr. 28, 2020

(54) CONVERSATIONAL CALENDAR INTEGRATION

(71) Applicant: Microsoft Technology Licensing, LLC., Redmond, WA (US)

(72) Inventor: Philipp Anatolievich Cannons, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 221 days.

(21) Appl. No.: 15/276,646

(22) Filed: Sep. 26, 2016

(65) Prior Publication Data

US 2018/0089634 A1  Mar. 29, 2018

(51) Int. Cl.
*G06Q 10/10* (2012.01)
*H04L 12/58* (2006.01)
*H04L 12/18* (2006.01)

(52) U.S. Cl.
CPC ..... *G06Q 10/1095* (2013.01); *H04L 12/1818* (2013.01)

(58) Field of Classification Search
CPC ......... G06F 15/16; G06Q 10/00–99/00; H04L 1/00–69/00
USPC ................................................ 705/7.11–7.42
See application file for complete search history.

(56) References Cited

U.S. PATENT DOCUMENTS

| 5,428,784 | A | 6/1995 | Cahill, Jr. |
| 8,301,636 | B2 | 10/2012 | Stillion et al. |
| 8,645,181 | B2 | 2/2014 | Lehmann et al. |
| 2001/0054072 | A1* | 12/2001 | Discolo ............... G06F 15/0225 709/206 |
| 2006/0184885 | A1 | 8/2006 | Hayes et al. |
| 2008/0114636 | A1 | 5/2008 | Nellutla |
| 2008/0147469 | A1 | 6/2008 | Murillo et al. |
| 2009/0204414 | A1 | 8/2009 | Shah |
| 2011/0194683 | A1* | 8/2011 | Wilson ................. G06Q 10/109 379/202.01 |

(Continued)

FOREIGN PATENT DOCUMENTS

EP  1956531 A1 *  8/2008  ........... G06Q 10/109

OTHER PUBLICATIONS

Agostini, Alessandra & De Michelis, Giorgio & Patriarca, Stefano & Tinini, Renata. (1994). A Prototype of an Integrated Coordination Support System. Computer Supported Cooperative Work. 2. 209-238. 10.1007/BF00805692. (Year: 1994).*

(Continued)

*Primary Examiner* — Alan S Miller
*Assistant Examiner* — Jay-Ming Wang
(74) *Attorney, Agent, or Firm* — Merchant & Gould

(57) ABSTRACT

Systems, methods and computer-readable media for providing conversational calendar integration are disclosed. According to aspects, a meeting organizer is able to select multiple proposed meeting times for the meeting. The attendees are presented with multiple proposed meeting times in the context of the attendee's calendar. The user interface within the meeting request is optimized to provide the user with a visual demonstration of the proposed meeting times, thereby providing the attendee with the ability to quickly and visually identify whether any of the proposed meeting times conflict. Thus, conversational calendar integration reduces network traffic and improves network efficiency/performance.

20 Claims, 26 Drawing Sheets

(56) References Cited

U.S. PATENT DOCUMENTS

| | | | |
|---|---|---|---|
| 2013/0054295 A1 | 2/2013 | Bhogal et al. | |
| 2014/0136630 A1* | 5/2014 | Siegel | G06Q 10/1095 709/206 |
| 2015/0106147 A1 | 4/2015 | Patankar et al. | |
| 2015/0112749 A1 | 4/2015 | Erdal | |
| 2015/0193740 A1 | 7/2015 | Nudel et al. | |
| 2015/0332219 A1* | 11/2015 | Putterman | G06Q 10/1095 705/7.19 |

OTHER PUBLICATIONS

"Propose or accept a new meeting time", Retrieved on: Sep. 13, 2016 Available at: https://support.office.com/en-us/article/Propose-or-accept-a-new-meeting-time-d8658a72-8611-4a4d-a641-dba769e2069a#bm1.

"Create and send a voting poll in an email message", Retrieved on: Sep. 13, 2016 Available at: https://support.office.com/en-ie/article/Create-and-send-a-voting-poll-in-an-email-message-32b34320-a8c8-4b49-8f2d-9609188cd396.

* cited by examiner

MOBILE COMPUTING DEVICE

CONVERSATIONAL CALENDAR INTEGRATION

BACKGROUND

Persons typically use productivity applications, such as calendaring applications, in their daily activities. Productivity applications provide many advantages in managing daily activities including the ability to schedule meetings with other persons.

However, a person attempting to schedule a meeting frequently encounters difficulty selecting a meeting time in which other persons are available to meet. In most situations, a person has little, if any, knowledge regarding another person's availability. As a result, in some situations, the person may rely on calling each of the other persons in order to determine their availability. In other situations, the person may send numerous back and forth emails to the other persons to merely discuss various available times. Based on all of these conversations, the person would then select a time and send the meeting request to the other persons.

Alternatively, the person may simply select a meeting time and send the meeting request. In response, the invitees respond whether they accept the meeting time or propose a new meeting time. However, a typical meeting request may result in one or more persons accepting the meeting and one or more persons proposing multiple new times. Consequently, the meeting organizer is still uncertain about a suitable time for scheduling the meeting.

SUMMARY

This summary is provided to introduce a selection of concepts in a simplified form that are further described below in the Detailed Description section. This summary is not intended to identify all key or essential features of the claimed subject matter, nor is it intended as an aid in determining the scope of the claimed subject matter.

Systems, methods and computer-readable media for providing conversational calendar integration are disclosed. According to aspects, when a meeting organizer is attempting to schedule a meeting with one or more attendees, the meeting organizer is able to select multiple proposed meeting times for the meeting and send an email with the meeting request to the one or more attendees. When an attendee receives and opens the email, the attendee is presented with multiple proposed meeting times in the context of the attendee's calendar. In other words, the user interface within the meeting request is optimized to provide the user with a visual demonstration of the proposed meeting times, thus providing the attendee with the ability to quickly and visually identify whether any of the proposed meeting times conflict. Further, the user interface within the meeting request is optimized to provide functionality to receive responses from the attendees. More particularly, each attendee is able to indicate which, if any, of the proposed meeting times are accepted. After the attendees make their selections and send their responses, the meeting organizer is able view all of the attendee's responses to the proposed meeting times. Based on the attendees' responses, the meeting organizer then selects one of the proposed times for scheduling the meeting.

Aspects of conversational calendar integration provide numerous advantages for scheduling a meeting, including reducing telephone call volume required for communications regarding invitees' schedules and availabilities, reducing e-mail and network traffic resulting from constant communications requesting invitees' availabilities, and improved network efficiency/performance. Therefore, a computer using conversational calendar integration improves the functioning of the computer itself or effects an improvement in a network or another computer.

Examples are implemented as a computer process, a computing system, or as an article of manufacture such as a device, computer program product, or computer readable medium. According to an aspect, the computer program product is a computer storage medium readable by a computer system and encoding a computer program comprising instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings:

FIGS. 4-22 illustrate various aspects of example graphical user interfaces in which conversational calendar integration are implemented;

DETAILED DESCRIPTION

Figure 1:
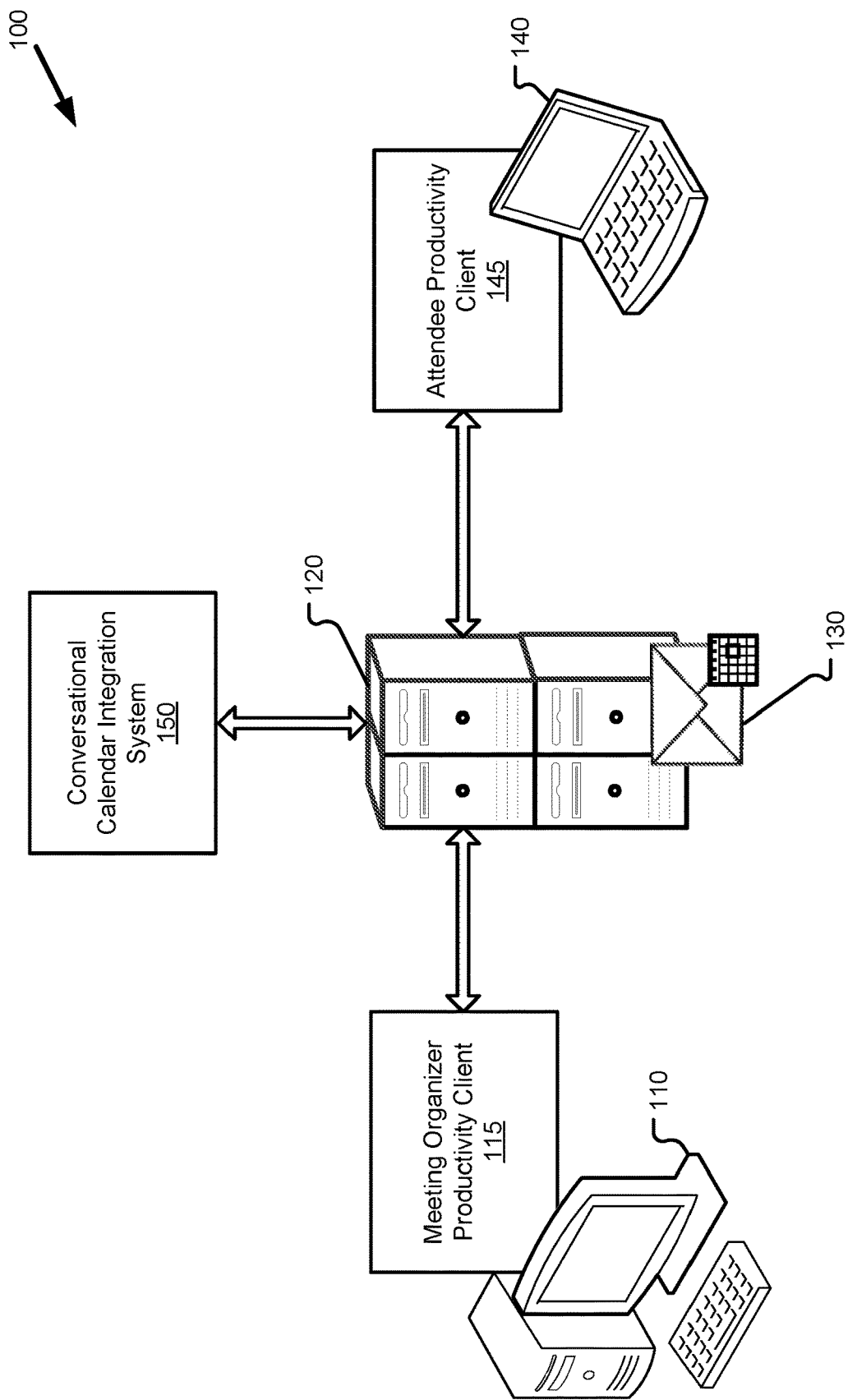
FIG. 1 is an example environment in which conversational calendar integration is implemented.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

Systems, methods and computer-readable media for providing conversational calendar integration are disclosed. According to aspects, when a meeting organizer is attempting to schedule a meeting with one or more attendees, the meeting organizer is able to select multiple proposed meeting times for the meeting and send an email with the meeting request to the one or more attendees. When an attendee receives and opens the email, the attendee is presented with multiple proposed meeting times in the context of the attendee's calendar. In other words, the user interface within the meeting request is optimized to provide the user with a visual demonstration of the proposed meeting times, thus providing the attendee with the ability to quickly and visually identify whether any of the proposed meeting times conflict. Further, the user interface within the meeting request is optimized to provide functionality to receive responses from the attendees. More particularly, each attendee is able to indicate which, if any, of the proposed meeting times are accepted. After the attendees make their selections and send their responses, the meeting organizer is able view all of the attendees' responses to the proposed meeting times. Based on the attendees' responses, the meeting organizer then selects one of the proposed times for scheduling the meeting.

Aspects of conversational calendar integration provide numerous advantages for scheduling a meeting, including reducing telephone call volume required for communications regarding attendees' schedules and availabilities, reducing e-mail and network traffic resulting from constant communications requesting attendees' availabilities, and improved network efficiency/performance. Therefore, a computer using conversational calendar integration improves the functioning of the computer itself or effects an improvement in a network or another computer.

FIG. 1 is an example environment 100 in which conversational calendar integration is implemented. As illustrated, a meeting organizer computing device 110 is running a meeting organizer productivity client 115, which communicates with a server 120 to send a meeting request 130 to be received by an attendee computing device 140 via an attendee productivity client 145. Various servers 120 and intermediaries may lie between the meeting organizer machine 110 and the attendee computing device 140 to route the meeting request 130 between the meeting organizer and the attendee. In various aspects, the meeting organizer is also an attendee, while in other aspects, the meeting organizer is not an attendee.

The server 120 communicates with a conversational calendar integration system 150 to provide conversational calendar functionality for the meeting request 130. The conversational calendar integration system 150 provides a user interface for creating a meeting request 130 including one or more attendees and multiple meeting times. The conversational calendar integration system 150 integrates functionality within the meeting request 130 for displaying an attendee's calendar within the meeting request 130 and for receiving the attendee's response to each of the multiple proposed meeting times. The conversational calendar integration system 150 is configured to receive a selection of one of the multiple proposed meeting times for a finalized meeting time and send a meeting update. While the conversational calendar integration system 150 is shown remotely from the meeting organizer computing device 110 or the server 120 for illustrative purposes, it should be noted that the conversational calendar integration system 150 is suitable in several configurations including, without limitation, a separate system hosted by the meeting organizer computing device 110 or the server 120, an integral aspect of the meeting organizer computing device 110 or the server 120, or a remote server.

The meeting organizer computing device 110 and attendee computing device 140 are illustrative of a computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, and mainframe computers. The hardware of these computing systems is discussed in greater detail in regard to FIGS. 23, 24A, 24B, and 25. In various aspects, the meeting organizer computing device 110 and attendee computing device 140 are accessed locally and/or by a network, which may include the Internet, a Local Area Network (LAN), a private distributed network for an entity (e.g., a company, a university, a government agency), a wireless ad hoc network, a Virtual Private Network (VPN) or other direct data link (e.g., Bluetooth connection, a direct wired link).

The meeting organizer productivity client 115 and the attendee productivity client 145 used to send and receive the meeting request 130 are illustrative of a productivity application used to send and receive meeting requests, including, without limitation, local applications and cloud-based applications, such as for example: Google Calendar™ (offered by Alphabet, Inc. of Mountain View, Calif.), Sunbird® (offered by the Mozilla Foundation of Mountain View, Calif.), or Outlook® (available from Microsoft Corp. of Redmond, Wash.). According to other aspects, the meeting organizer productivity client 115 and the attendee productivity client 145 also includes productivity applications, such as messaging applications, for receiving meeting requests, which can direct the user to an online calendaring functionality. Examples of messaging applications that may be used locally or collaboratively include, but are not limited to: the Outlook® messaging application (available from Microsoft, Corp. of Redmond, Wash.), the Gmail™ messaging application (available from Alphabet, Inc. of Mountain View, Calif.), the Mail messaging application (available from Apple, Inc. of Cupertino, Calif.). Such productivity applications may store content items locally or in the cloud via cloud storage solutions, such as, for example, Google Drive™ or OneDrive® (available from Alphabet, Inc. and Microsoft, Corp., respectively). In various aspects, the meeting organizer productivity client 115 and the attendee productivity client 145 may be different instances of the same application or program, or they may be unique instances of different applications or programs.

The meeting request 130 may be composed, formatted, transmitted, and received according to various standards (and various versions thereof), including, but not limited to: POP (Post Office Protocol), IMAP (Internet Message Access Protocol), MIME (Multipurpose Internet Mail Extension), SMTP (Simple Mail Transfer Protocol), HTML (Hypertext Markup Language), Rich Text, Plain Text, etc.

Figure 2:
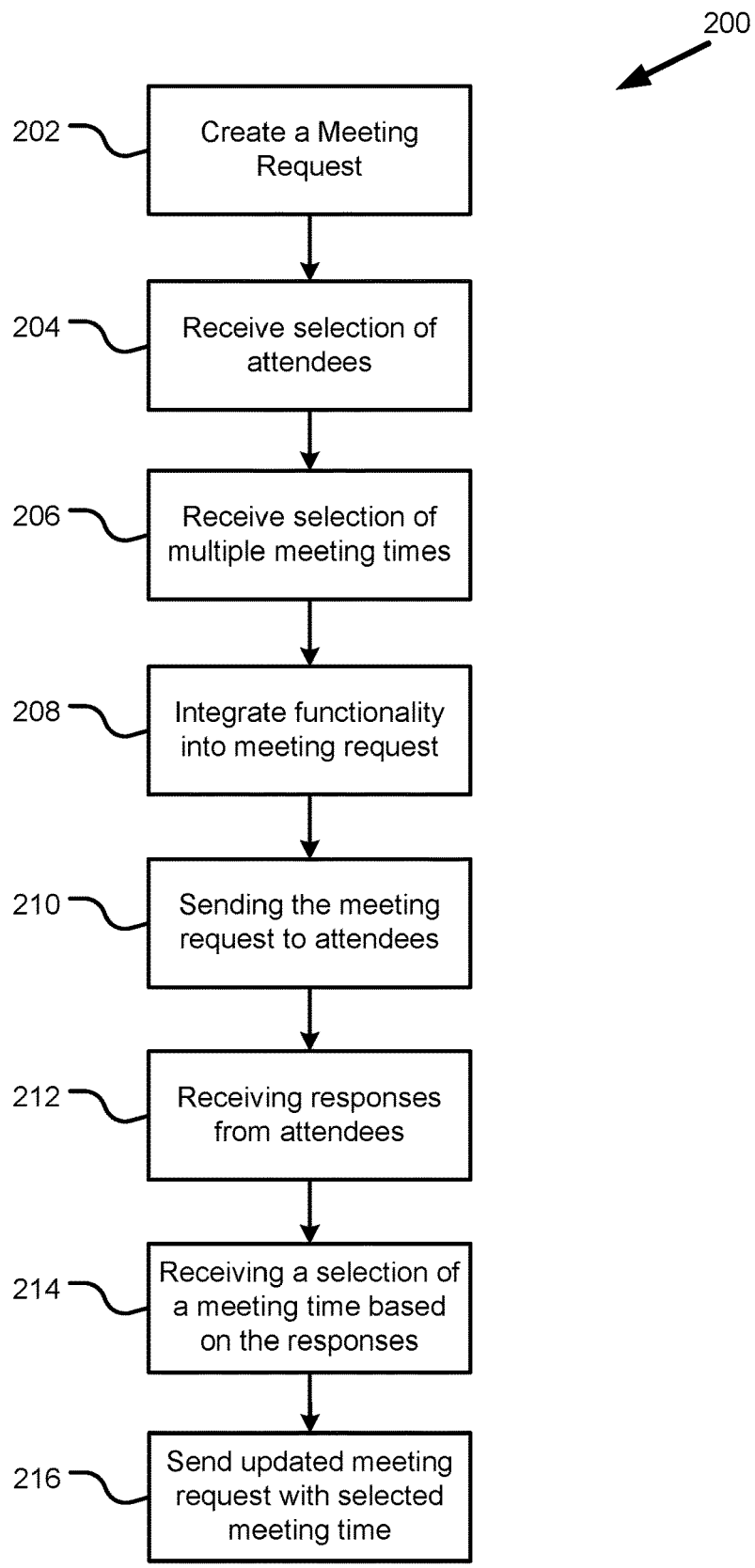
FIG. 2 is a flow chart showing general stages involved in an example method for conversational calendar integration.

FIG. 2 is a flow chart showing general stages involved in an example method 200 for reducing network traffic and improving network efficiency/performance by providing conversational calendar integration. The method 200 begins at OPERATION 202, where the computing system displays a user interface for creating a meeting request 130. For example, the meeting organizer utilizes a calendaring application to create the meeting request 130.

Method 200 proceeds to OPERATION 204, where the computing system receives a selection of one or more attendees for the meeting. In one example, the meeting organizer selects one or more contacts for adding to the meeting request. In another example, the meeting organizer selects one or more attendees by entering an email addresses associated with the attendees. In yet another example, the meeting organizer selects one or more attendees based upon a messaging identifier.

At OPERATION 206, the computing system receives a selection of multiple proposed meeting times for the meeting. The multiple proposed meeting times may include a variety of times and dates. Indeed, in order to increase the likelihood that one or more of the meeting times would be suitable, the meeting organizer may select varying times for scheduling the meeting. In further aspects, the place of the meeting (e.g., Conference Room A, Conference Room B) is the same for the different proposed times, varied for the different proposed times, or is omitted from the proposed times until a final meeting time is selected.

The method 200 proceeds to OPERATION 208, where the computing system integrates conversational calendar functionality into the meeting request 130. According to one aspect, the meeting request 130 integrates functionality to displaying an attendee's calendar within the meeting request 130. It should be noted, according to one example, that the attendee's calendar is dynamically integrated such that the meeting request includes all of the calendar items within the attendee's calendar. According to one aspect, the meeting request 130 integrates functionality to receive the attendee's response to each of the multiple proposed meeting times. For example, the meeting request 130 may provide options for accepting or rejecting each of the proposed meeting times.

After the meeting organizer has selected the one or more attendees and multiple proposed meeting times, the method 200 proceeds to OPERATION 210, where the computing system sends the meeting request 130 to each of the one or more attendees.

At OPERATION 212, the computing system receives responses from the one or more attendees. As discussed above, the responses may include acceptances, rejections or a combination of acceptances and rejections.

In response to receiving responses from the one or more attendees, the method 200 proceeds to OPERATION 214, where the computing system receives a selection of one of the multiple proposed meeting times for a finalized meeting time. The calendaring application may use numerous implementations for interacting with the meeting organizer. According to one aspect, the calendaring application displays the meeting request user interface that includes the responses from the attendees. In one example, the meeting request user interface displays a user interface element for each proposed meeting time of the multiple proposed meeting times. Each of the user interface elements indicate the number of acceptances from the attendees for the proposed meeting times. Accordingly, the meeting organizer selects one of the user interface elements associated with a proposed meeting time to establish a desired meeting time. In another example, the meeting request user interface displays user interface elements that identify each of the attendees. The user interface elements that identify each of the attendees may include indications of whether each of the attendees have responded, not responded or declined all of the proposed meeting times. It should also be noted, when the productivity application receives acceptances from each of the attendees, the productivity application may automatically finalize a selected time.

In response to receiving a selection of a desired time, the method 200 proceeds to OPERATION 216, where the computing system sends an update to the meeting request 130 with the selected meeting time.

Figure 3:
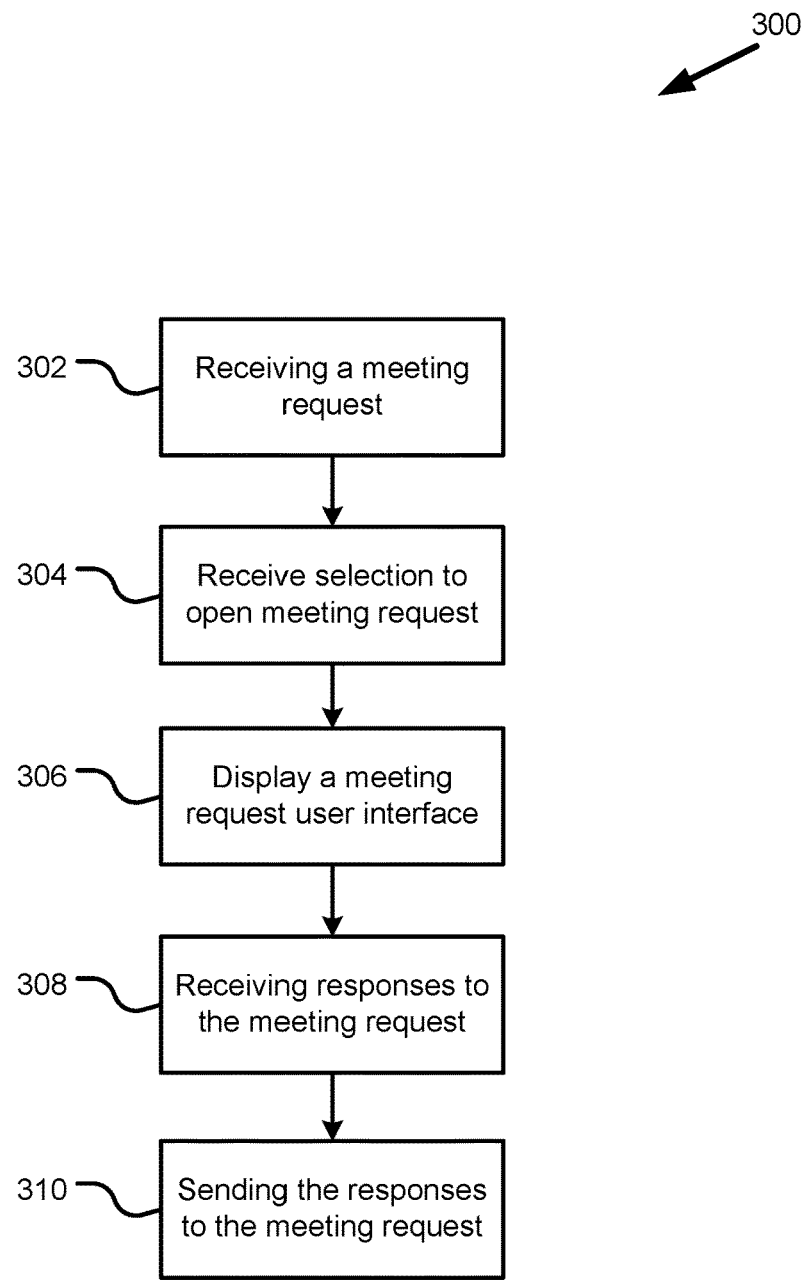
FIG. 3 is a flow chart showing general stages involved in an example method for conversational calendar integration.

FIG. 3 is a flow chart showing general stages involved in an example method 300 for reducing network traffic and improving network efficiency/performance by providing conversational calendar integration. The method 300 begins at OPERATION 302, where the computing system receives a meeting request 130 including multiple proposed meeting times. In one example, the attendee receives a meeting request 130 as a communication formatted in accordance with the productivity application. In another example, the meeting request 130 is an email that provides one or more links for responding. At OPERATION 304, the computing system receives a selection to open the meeting request 130.

The method 300 proceeds to OPERATION 306, where the computing system displays a meeting request user interface. According to one aspect, the computing system displays the meeting request user interface in association with the productivity application. The meeting request user interface includes functionality integrating an attendee's calendar within the meeting request. The attendee's calendar is dynamically integrated such that the meeting request 130 includes all of the calendar items within the attendee's calendar that fall on the dates displayed in the meeting request 130. The conversational calendar integration allows the attendee to view its calendar, including the proposed meeting times and any other calendar items within the meeting request 130. Thus, the attendee can quickly determine whether a proposed meeting time conflicts with another calendar item.

Further, the meeting request user interface includes functionality to receive attendee responses to the multiple proposed meeting times. Accordingly, the attendee is able to respond to the proposed meeting times, based on the attendee's availability, directly from the meeting request 130. Moreover, the attendee may address the proposed meeting times individually, collectively accept the proposed meeting times, or collectively reject the proposed meeting times. In other examples, the meeting request user interface includes options for providing a comment. For example, the attendee indicates that the attendee expects to be five minutes late to one of the proposed meeting times.

According to another aspect, the conversational calendar integration incorporates each of the multiple proposed meeting times into the attendee's calendar. Each of the proposed meeting times are incorporated into the attendee's calendar to provide an indication that the calendar item is associated with the meeting request 130. Further, the calendar items associated with the meeting request 130 include functionality to receive an attendee response to accept or decline the proposed meeting time directly from the attendee's calendar.

According to yet another aspect, the conversational calendar integration provides functionality to respond to the meeting request when the attendee is not currently using a supported calendaring application. In one example, when the attendee is associated with another messaging platform, the attendee receives an email with a link to the conversational calendar integration functionality. For example, the attendee selects the link and is directed to a secure website (personalized for the attendee) that displays the meeting request user interface. Accordingly, the attendee is able to respond to the meeting request directly from a webpage.

As discussed above, the computing system receives responses to the multiple proposed meeting times from the attendee at OPERATION 308. The method 300 proceeds to OPERATION 310, where the computing system sends responses to the multiple proposed meeting times from the attendee.

Figure 4:
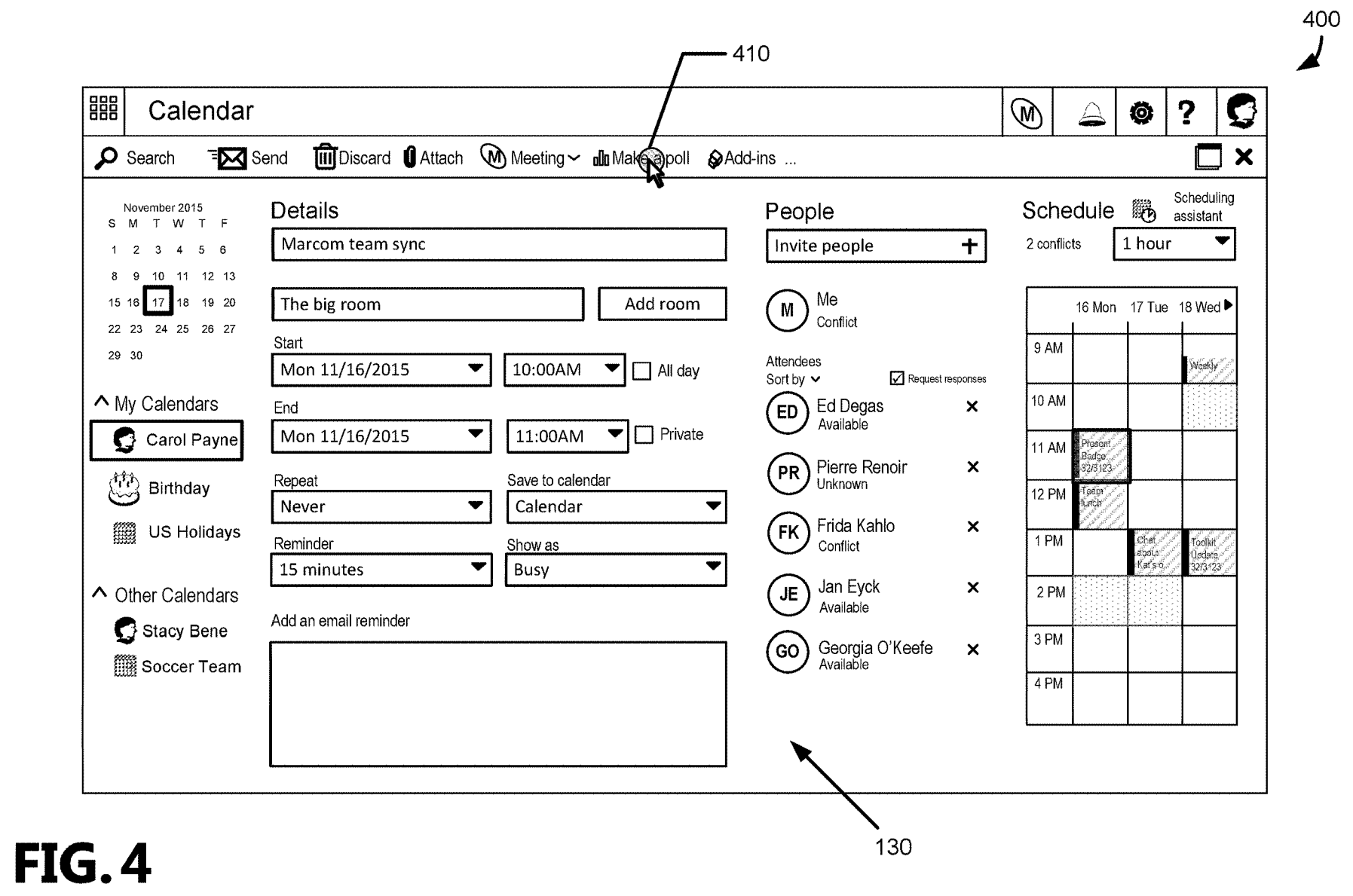

FIG. 4 is an illustration of an example graphical user interface 400 in which conversational calendar integration is implemented. According to aspects, the meeting request user interface displays an initial meeting request 130 associated with a single meeting date and time. The initial meeting request 130 specifies five attendees for the proposed meeting. Further, the meeting request user interface illustrates the meeting organizer selecting a control function 410 for enabling conversational calendar integration.

Figure 5:
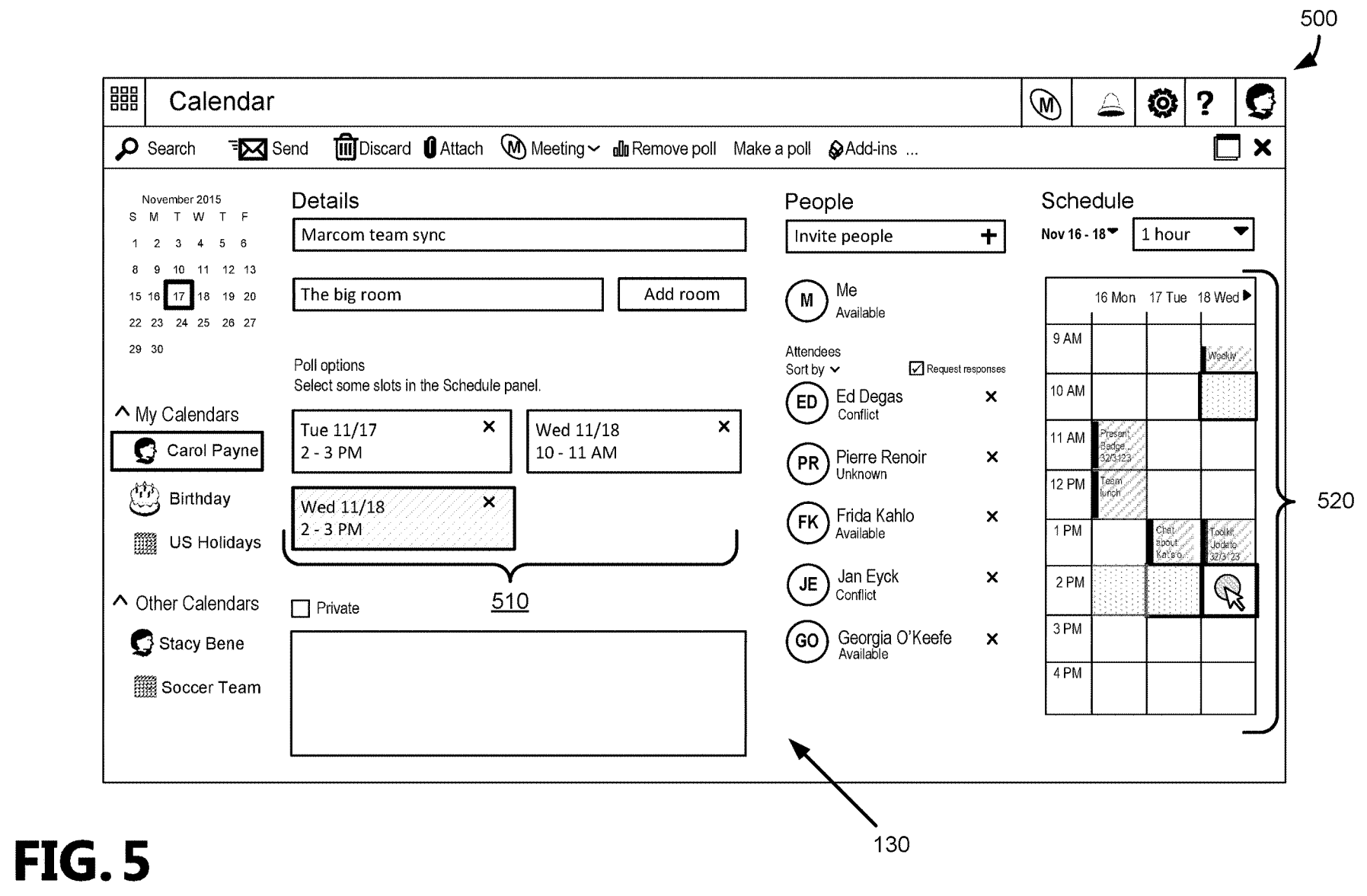

FIG. 5 is an illustration of an example graphical user interface 500 in which conversational calendar integration is implemented. In response to receiving a selection of the control function 410 shown in FIG. 4, the meeting request user interface displays functionality for selecting multiple proposed meeting times. According to one aspect, the meeting request user interface displays a calendar including a plurality of selectable time slots 520. In response to receiving a selection of a time slot 520, a new proposed meeting time corresponding to the time slot is added to the list of proposed meeting times 510. As shown in the meeting request user interface, the meeting organizer has selected three time slots 520 within the calendar.

Figure 6:
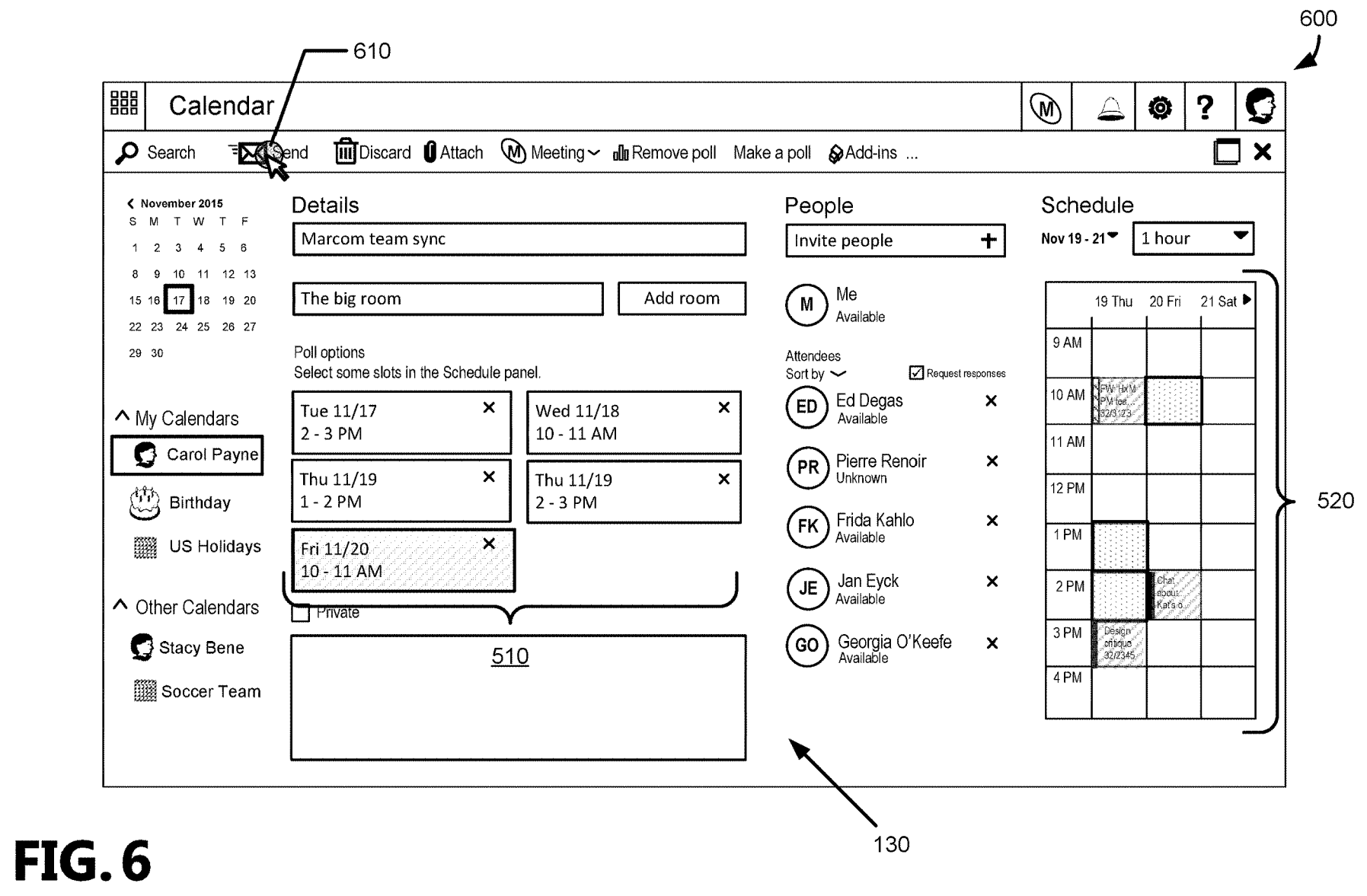

FIG. 6 is an illustration of an example graphical user interface 600 in which conversational calendar integration is implemented. As previously discussed with reference to FIG. 5, the meeting request user interface displays a calendar including a plurality of selectable time slots 520. As shown in FIG. 6, the meeting organizer has selected five time slots 520 within the calendar, which are current displayed as potential meeting times 510. Further, the meeting request user interface illustrates the meeting organizer selecting a control function 610 for sending the meeting request.

Figure 7:
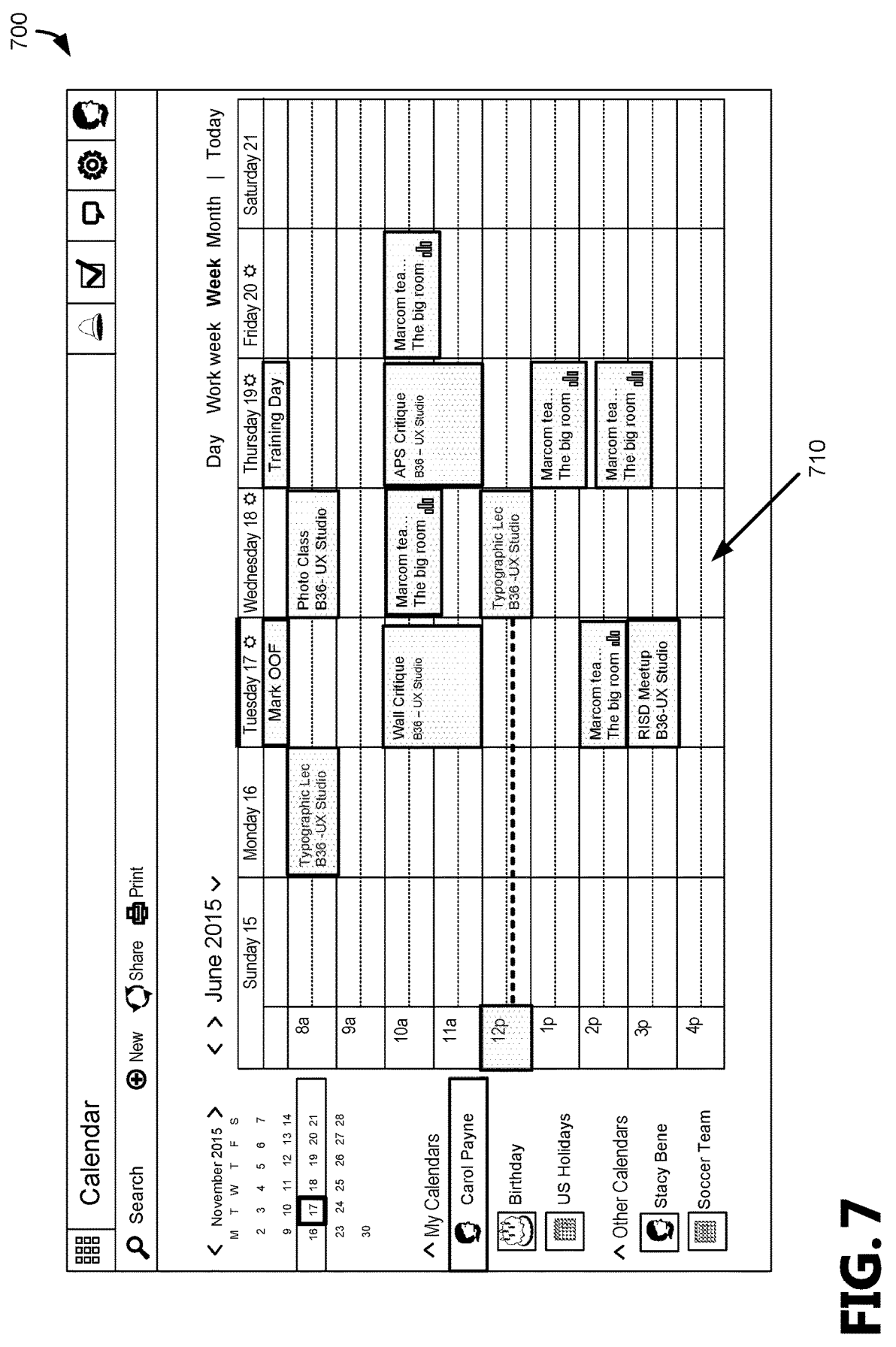

FIG. 7 is an illustration of an example graphical user interface 700 in which conversational calendar integration is implemented. More specifically, the example graphical user interface 700 displays a calendar view illustrating that the proposed meeting requests have been added to the meeting organizer's calendar 710. In the illustrated example, the example graphical user interface 700 displays calendar items for each of the five proposed meeting times in the corresponding time slot. Further, in the illustrated example, each of the calendar items includes an indication that identifies that the meeting request includes conversational calendar integration.

Figure 8:
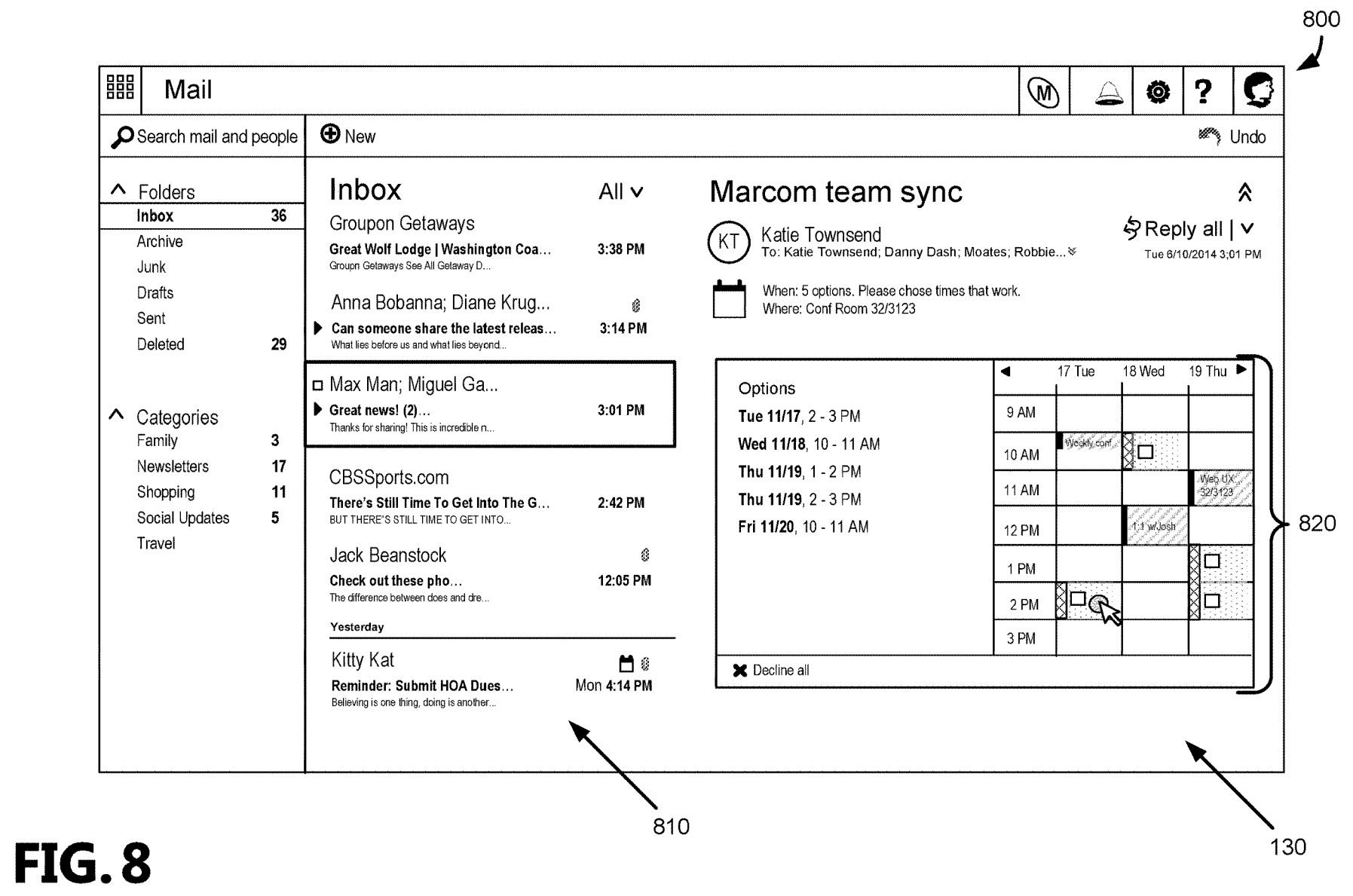

FIG. 8 is an illustration of an example graphical user interface 800 in which conversational calendar integration is implemented. The example graphical user interface 800 displays an inbox 810 for a meeting attendee. More specifically, the example graphical user interface 800 displays a meeting request 130 that includes conversational calendar integration. The meeting request 130 displays information relating to the proposed meeting times within the preview window 820 of a messaging application. In the illustrated example, the meeting request 130 displays a listing of multiple proposed meeting times and integrates the attendee's calendar within the meeting request 130. As previously discussed, the productivity application dynamically integrates the attendee's calendar within the meeting request 130. Accordingly, the integrated calendar accurately reflects the currently available time slots and the calendar items that are currently on the attendee's calendar. Further, according to certain aspects, in response to selection of a proposed meeting time within the listing, the calendar is moved to the relevant timeframe to display the selected meeting time in the attendee's calendar. As a result, the attendee may quickly view and determine whether to accept or decline each of the proposed times. In one example, when the attendee desires to accept a proposed time, the integrated calendar includes a selectable option for accepting the proposed time.

Figure 9:
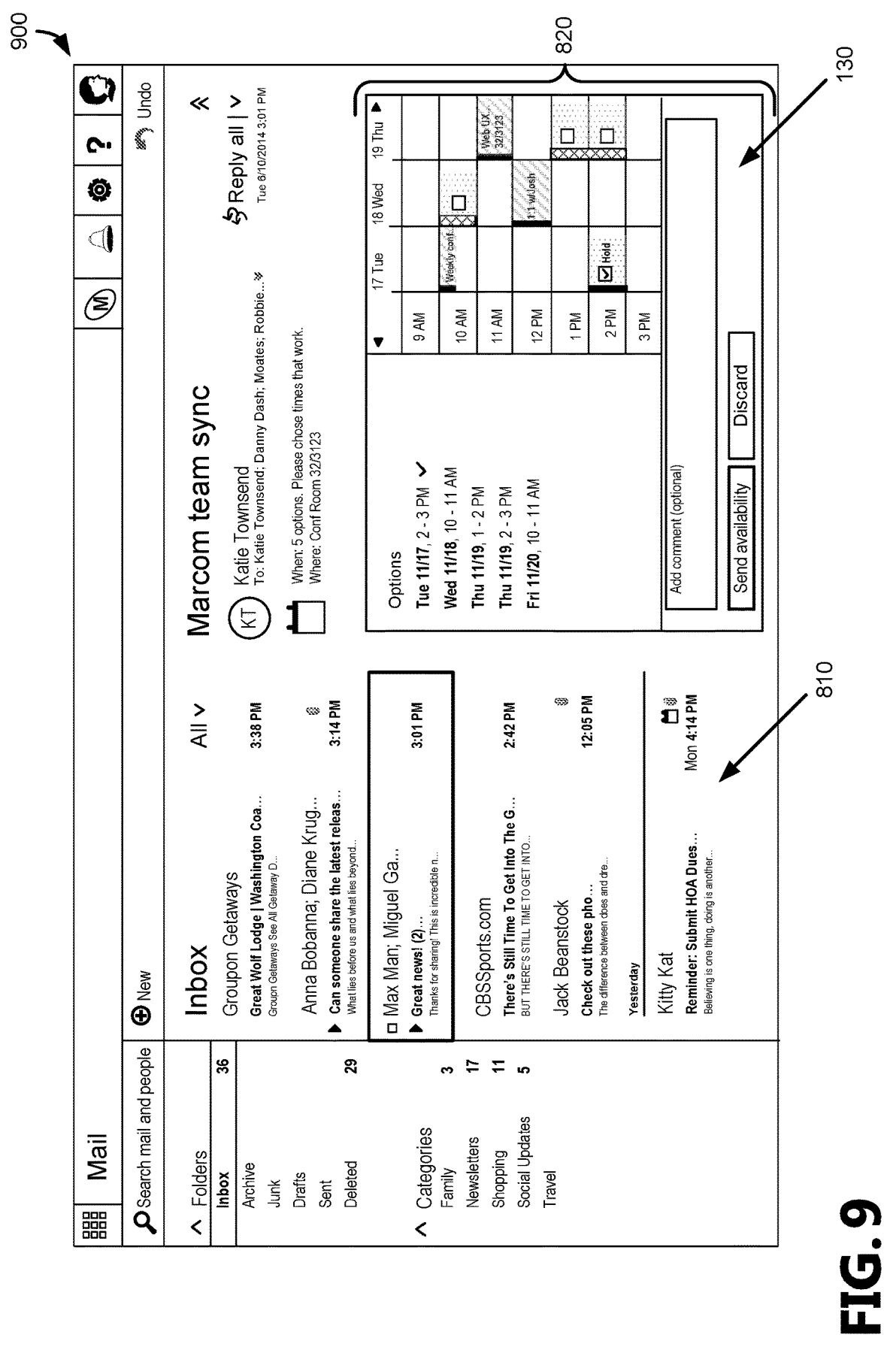

FIG. 9 is an illustration of an example graphical user interface 900 in which conversational calendar integration is implemented. According to one example, after the attendee has determined that a specified meeting time is suitable, the attendee selects a selectable control in the preview window 820 to indicate this selection. In response to receiving the selection, the listing of the multiple proposed meeting times is updated to display an indication that identifies that the corresponding time slot was selected.

Figure 10:
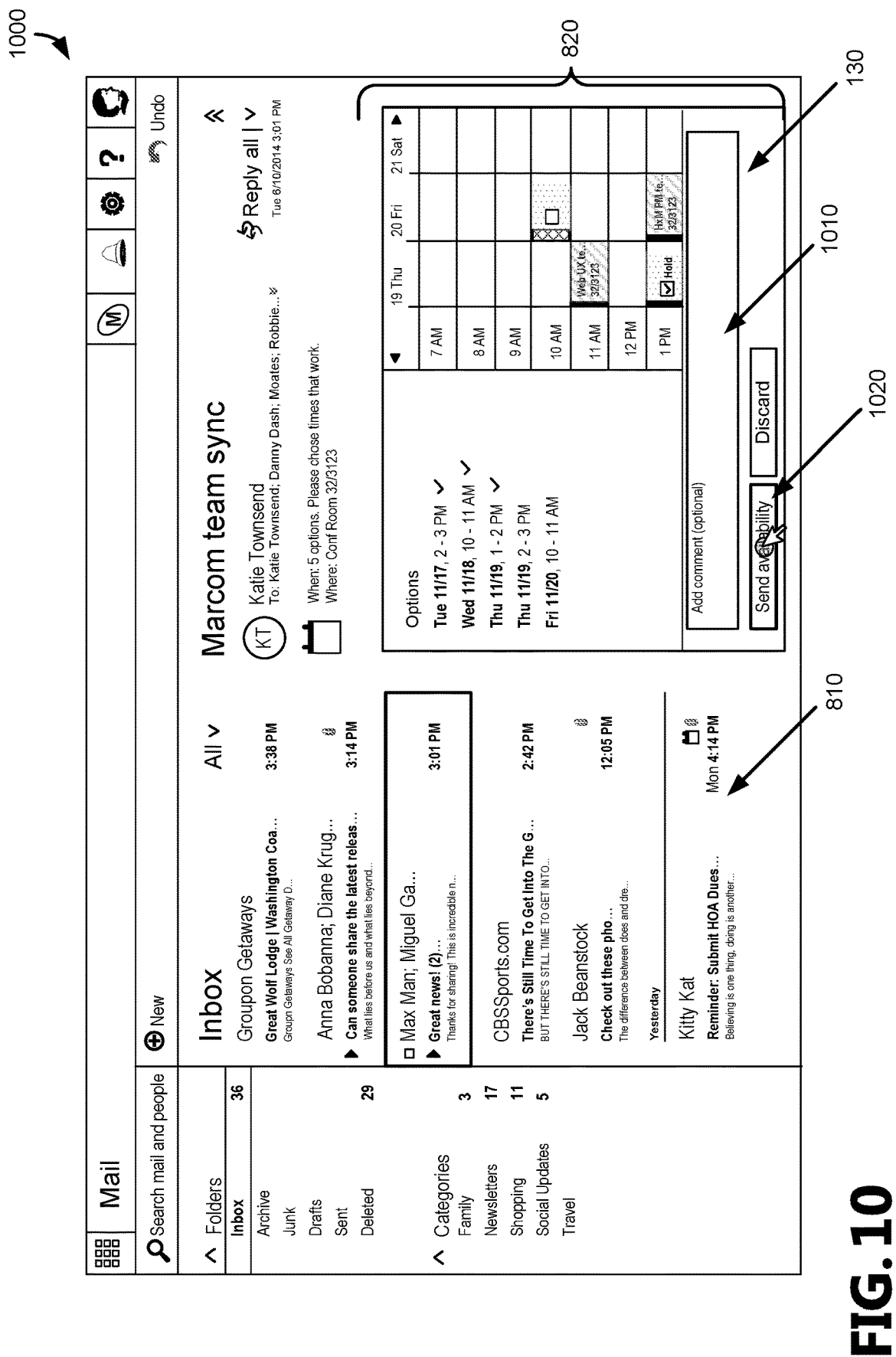

FIG. 10 is an illustration of an example graphical user interface 1000 in which conversational calendar integration is implemented. According to one example, after the attendee has made one or more selections for suitable meeting times, the attendee is able provided with an optional area 1010 to provide comments relating to the meeting. Further, the meeting request user interface illustrates the attendee is selecting a control function 1020 for sending the response to the meeting request 130. In other examples, the productivity application automatically sends the acceptance of any of the meeting times upon their selection as acceptable to the attendee.

Figure 11:
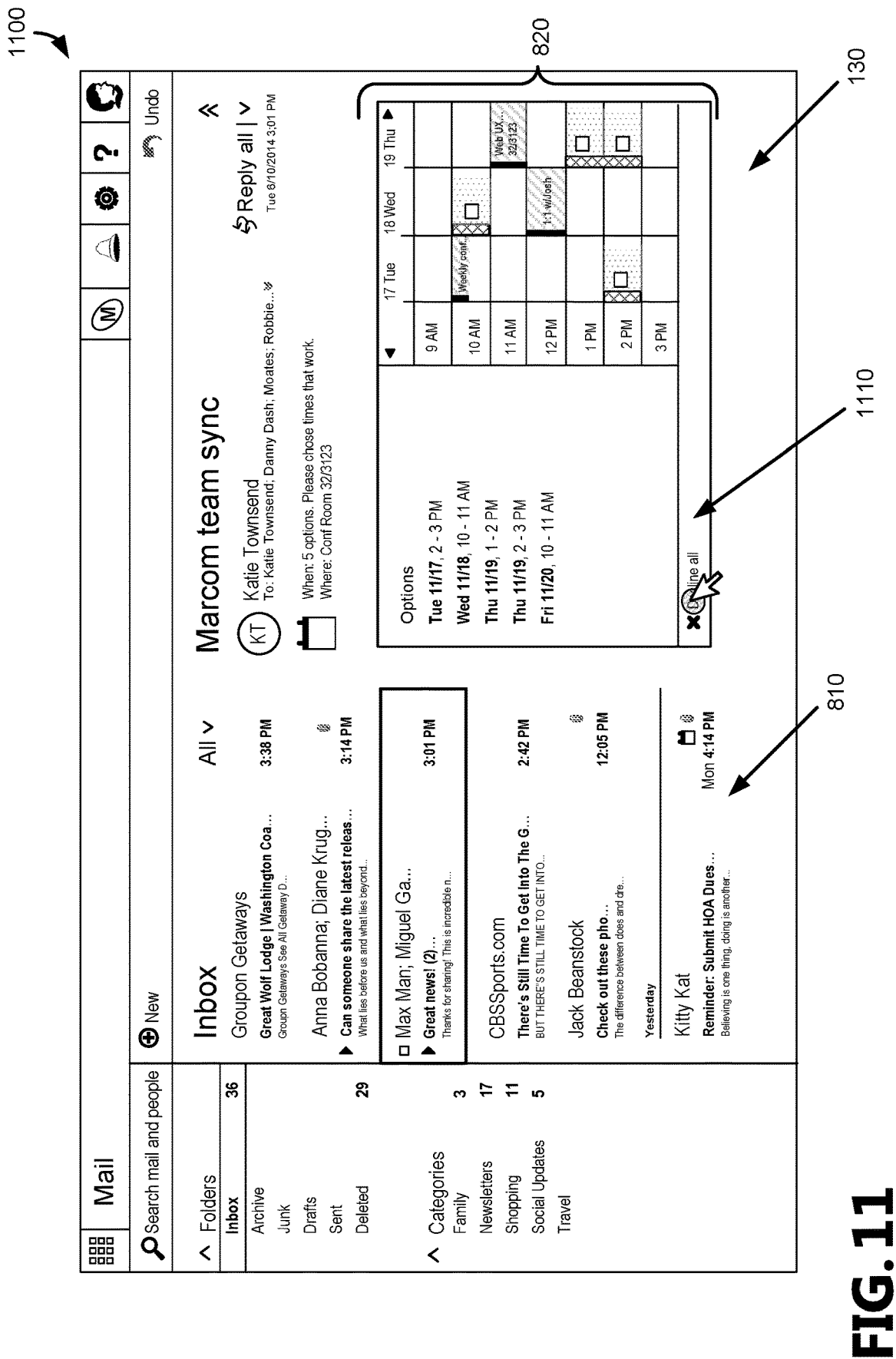

FIG. 11 is an illustration of an example graphical user interface 1100 in which conversational calendar integration is implemented. More specifically, the meeting request user interface illustrates the attendee selecting a control function 1110 for declining all of the proposed meeting times.

Figure 12:
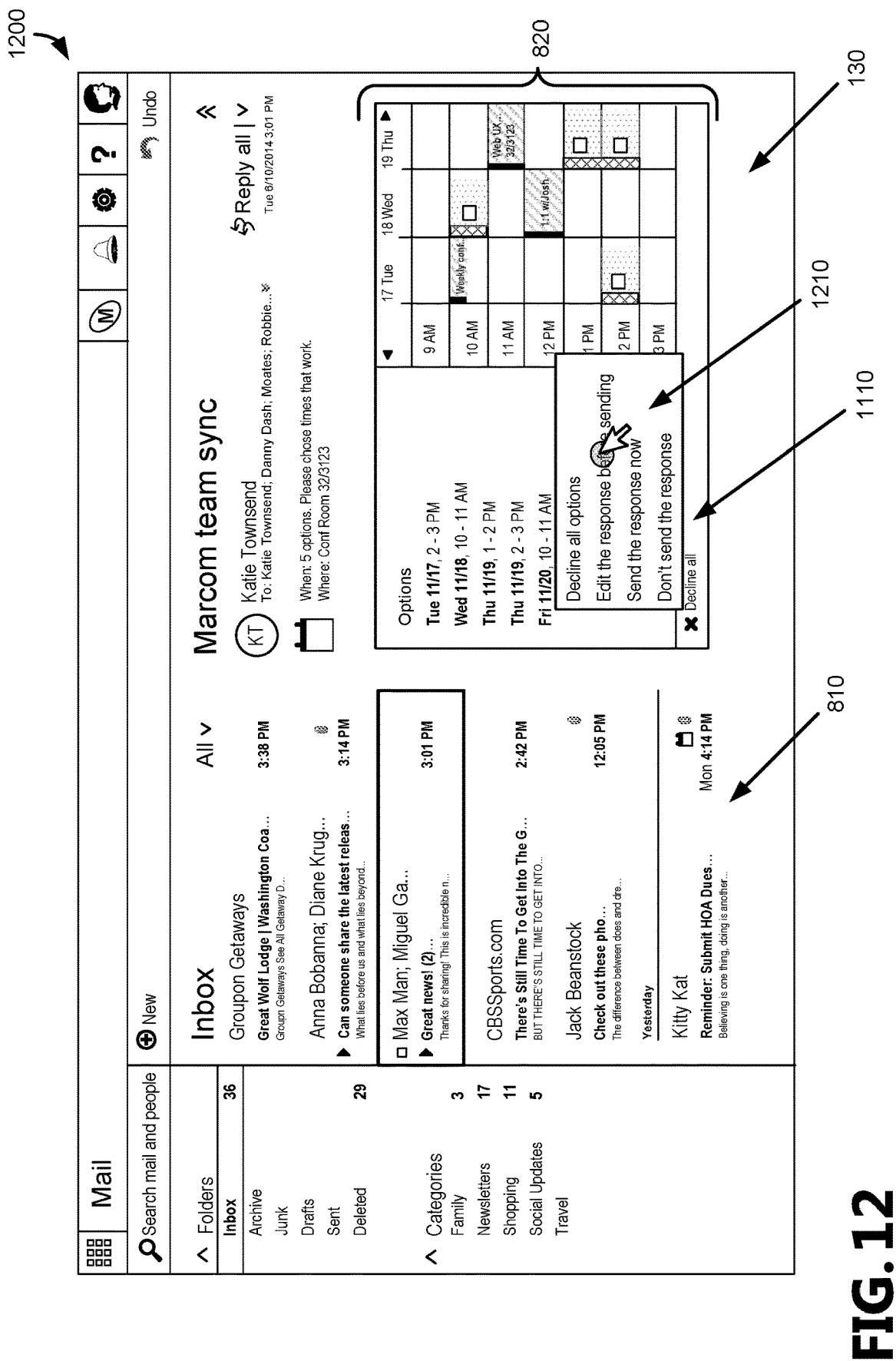

FIG. 12 is an illustration of an example graphical user interface 1200 in which conversational calendar integration is implemented. More specifically, the meeting request user interface illustrates the attendee has selected the control function 1100 for declining all of the proposed meeting times. Further, the meeting request user interface displays multiple options 1210 to decline all options, edit the response before sending, send the response now, or to not send the response.

Figure 13:
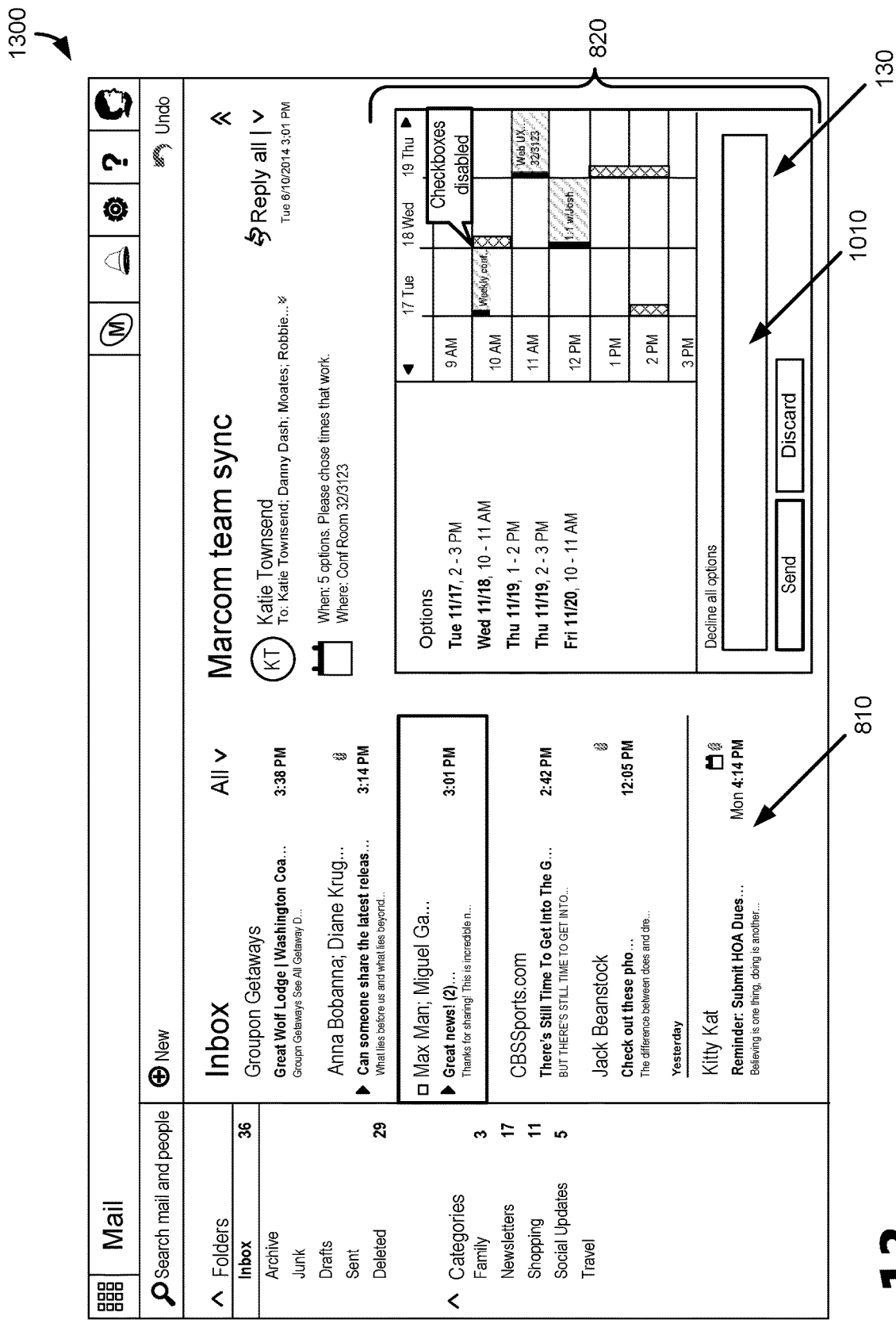

FIG. 13 is an illustration of an example graphical user interface 1300 in which conversational calendar integration is implemented. More specifically, the meeting request user interface illustrates that the attendee has selected the control function 1100 for declining all of the proposed meeting times. Further, the integrated calendar is updated to remove the options for selecting time slots suitable for the meeting. Further, the attendee is provided with an optional area 1010 to provide comments relating to declining the meeting.

Figure 14:
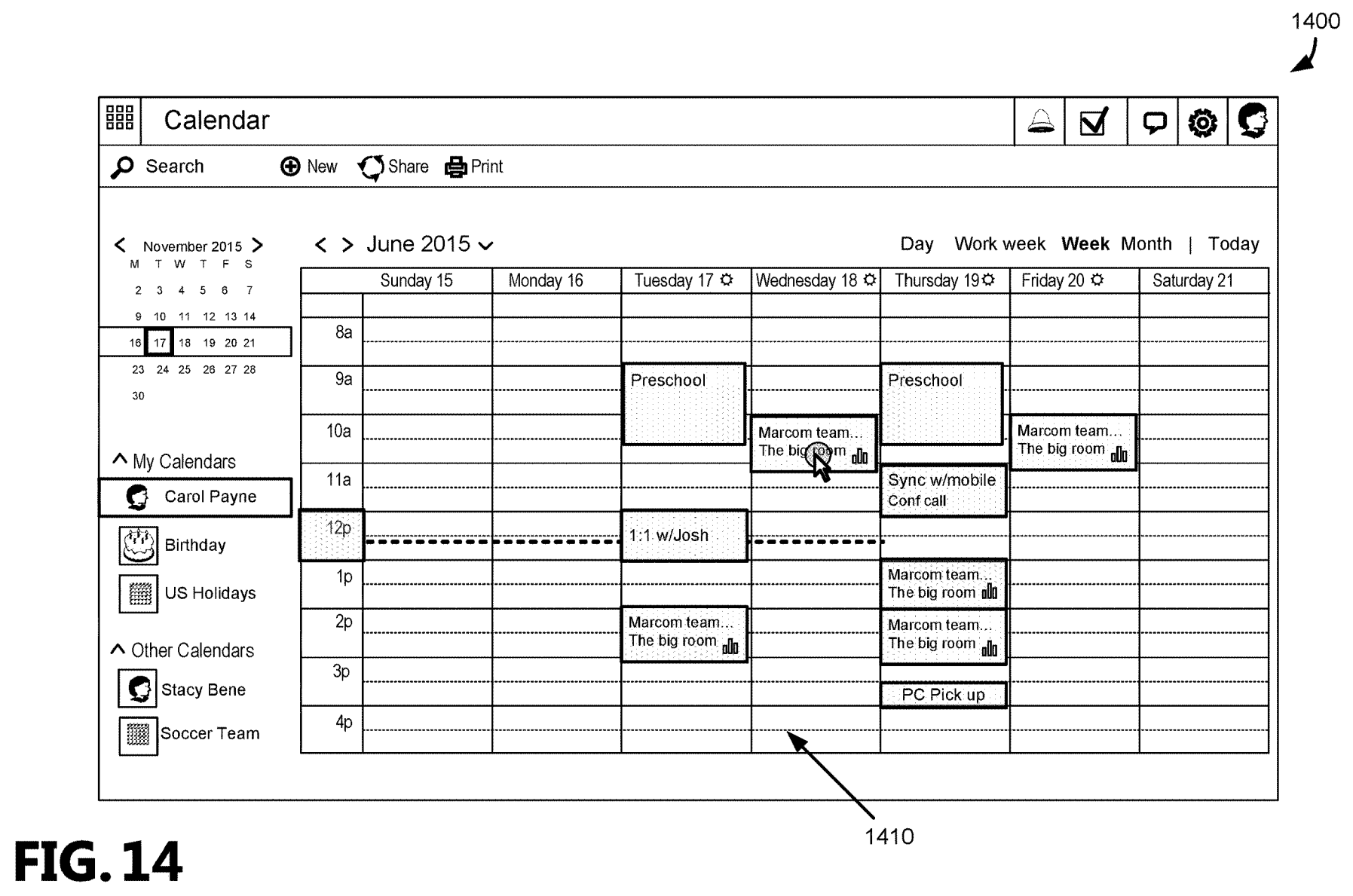

FIG. 14 is an illustration of an example graphical user interface 1400 in which conversational calendar integration is implemented. More specifically, the example graphical user interface 1400 displays a calendar view 1410 illustrating that the meeting request 130 has been added to the attendee's calendar. In the illustrated example, the example graphical user interface 1400 displays calendar items for each of the five proposed meeting times in the corresponding time slots. Further, in the illustrated example, each of the calendar items includes an indication that identifies that the meeting request 130 includes conversational calendar integration. Further, the meeting request user interface illustrates the attendee is interacting with one of the calendar items. For example, the attendee is able to double-click on the calendar item to display more details.

Figure 15:

FIG. 15 is an illustration of an example graphical user interface 1500 in which conversational calendar integration is implemented. According to one aspect, the illustrated meeting request user interface is displayed in response to the attendee interaction with the calendar item.

Figure 16:
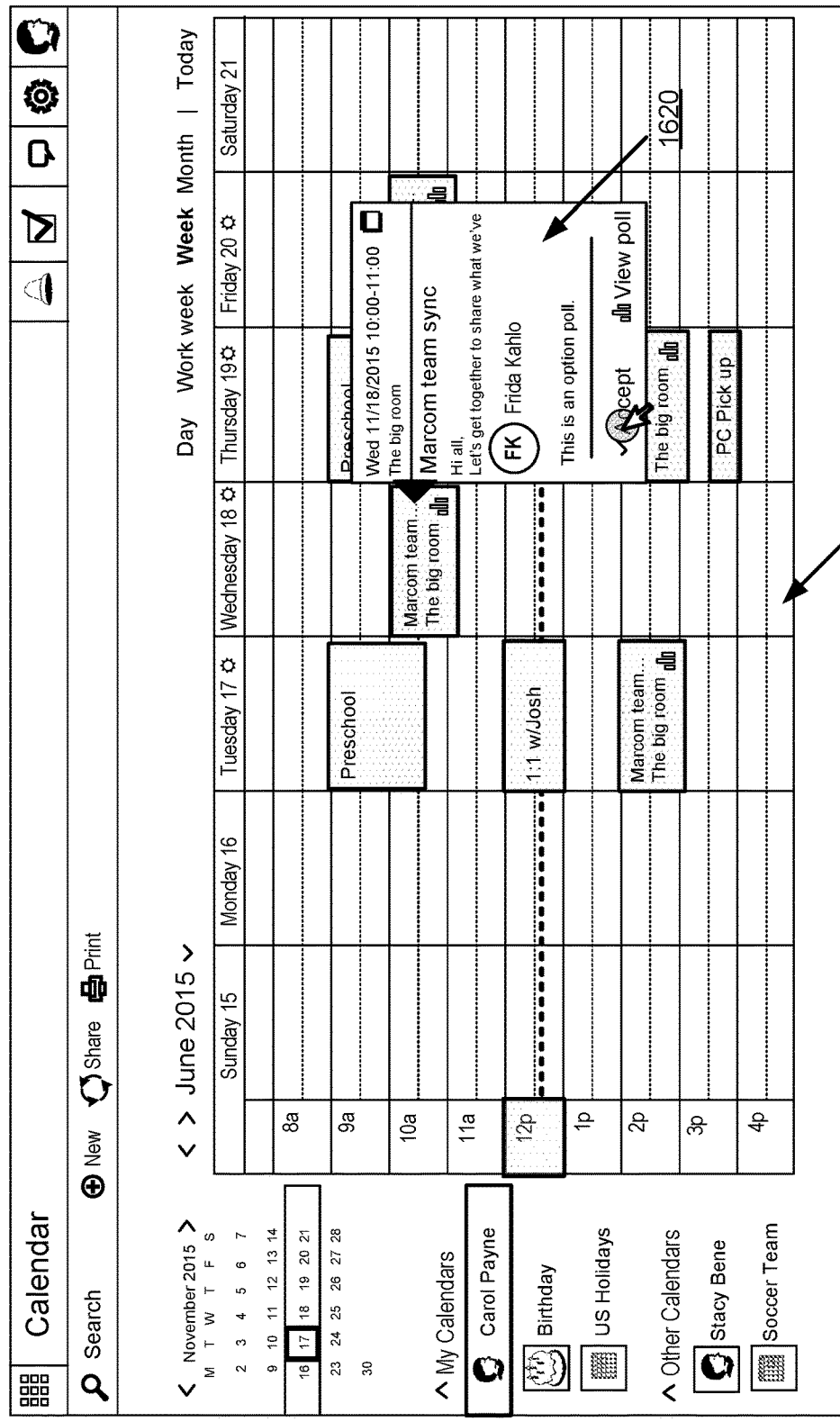

FIG. 16 is an illustration of an example graphical user interface 1600 in which conversational calendar integration is implemented. More specifically, the example graphical user interface 1600 displays a calendar view 1610 illustrating that the meeting request has been added to the attendee's calendar. In the illustrated example, the example graphical user interface 1600 displays calendar items for each of the five proposed meeting times in the corresponding time slot. Further, in the illustrated example, each of the calendar items includes an indication that identifies that the meeting request 130 includes conversational calendar integration. Further, the meeting request user interface illustrates the attendee interacting with one of the calendar items. For example, the attendee is able to right click on the calendar item to display a popup 1620 for accepting the calendar item.

Figure 17:
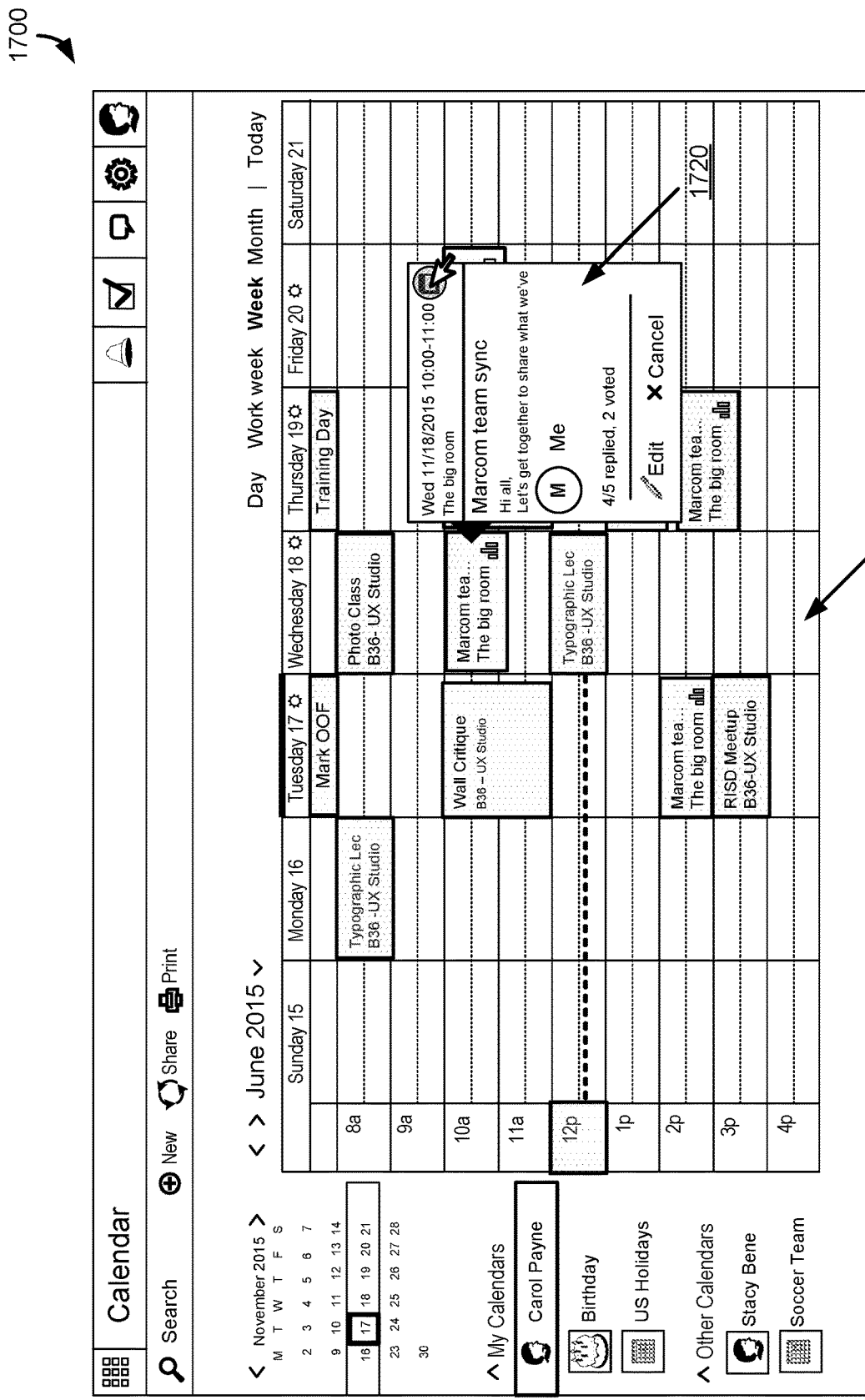

FIG. 17 is an illustration of an example graphical user interface 1700 in which conversational calendar integration is implemented. More specifically, the example graphical user interface 1700 displays a calendar view 1710 illustrating that the meeting requests have been added to the meeting organizer's calendar. In the illustrated example, the example graphical user interface 1700 displays calendar items for each of the five proposed meeting times in the corresponding time slot. Further, the meeting request user interface illustrates the meeting organizer interacting with one of the calendar items. For example, the meeting organizer right clicks on the calendar item to display a popup 1720 providing information regarding the attendee responses to the proposed meeting time. In some examples, the popup 1720 displays a control function for displaying details relating to the attendee responses.

Figure 18:

FIG. 18 is an illustration of an example graphical user interface 1800 in which conversational calendar integration is implemented. The illustrated meeting request user interface displays user interface elements displaying the potential meeting times. However, none of the user interface elements display a response to the meeting times. Further, the listing 1810 of attendees associated with the meeting indicates "No response" for each of the attendees.

Figure 19:
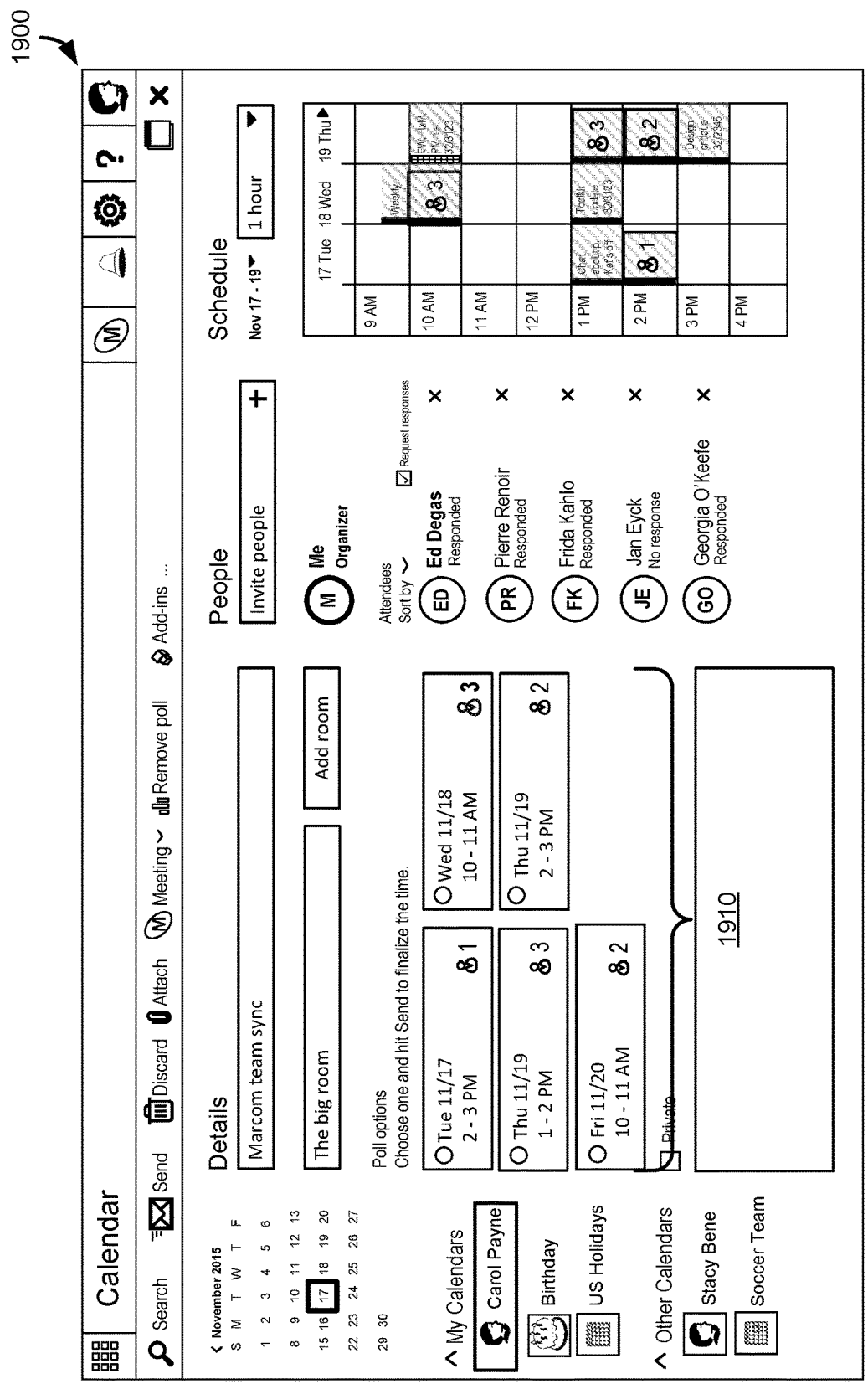

FIG. 19 is an illustration of an example graphical user interface 1900 in which conversational calendar integration is implemented. The illustrated meeting request user interface displays user interface elements displaying the potential meeting times and providing an indication of attendee responses. As illustrated, the meeting request user interface indicates varying amounts of suitability of the meeting times. Further, the listing 1910 of attendees associated with the meeting indicates that four of the attendees have responded to the meeting request 130.

Figure 20:
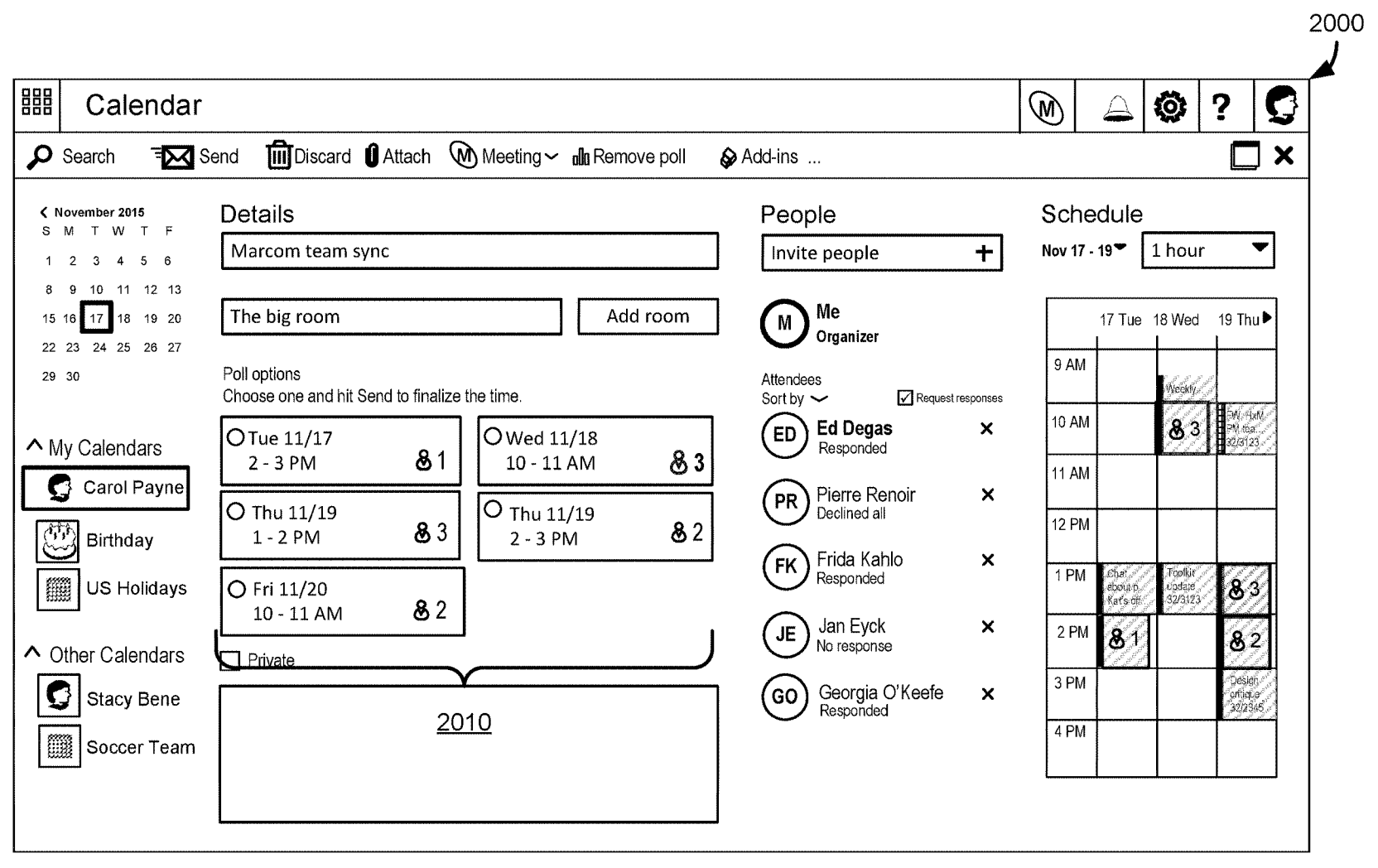

FIG. 20 is an illustration of an example graphical user interface 2000 in which conversational calendar integration is implemented. More specifically, the illustrated meeting request user interface shows the listing 2010 of attendees associated with the meeting, which indicates that one attendee declined all of the times.

Figure 21:

FIG. 21 is an illustration of an example graphical user interface 2100 in which conversational calendar integration is implemented. More specifically, the meeting request user interface illustrates that the meeting organizer has selected the "Thu 11/19" meeting time and is currently in the process of selecting the send function control 610.

Figure 22:
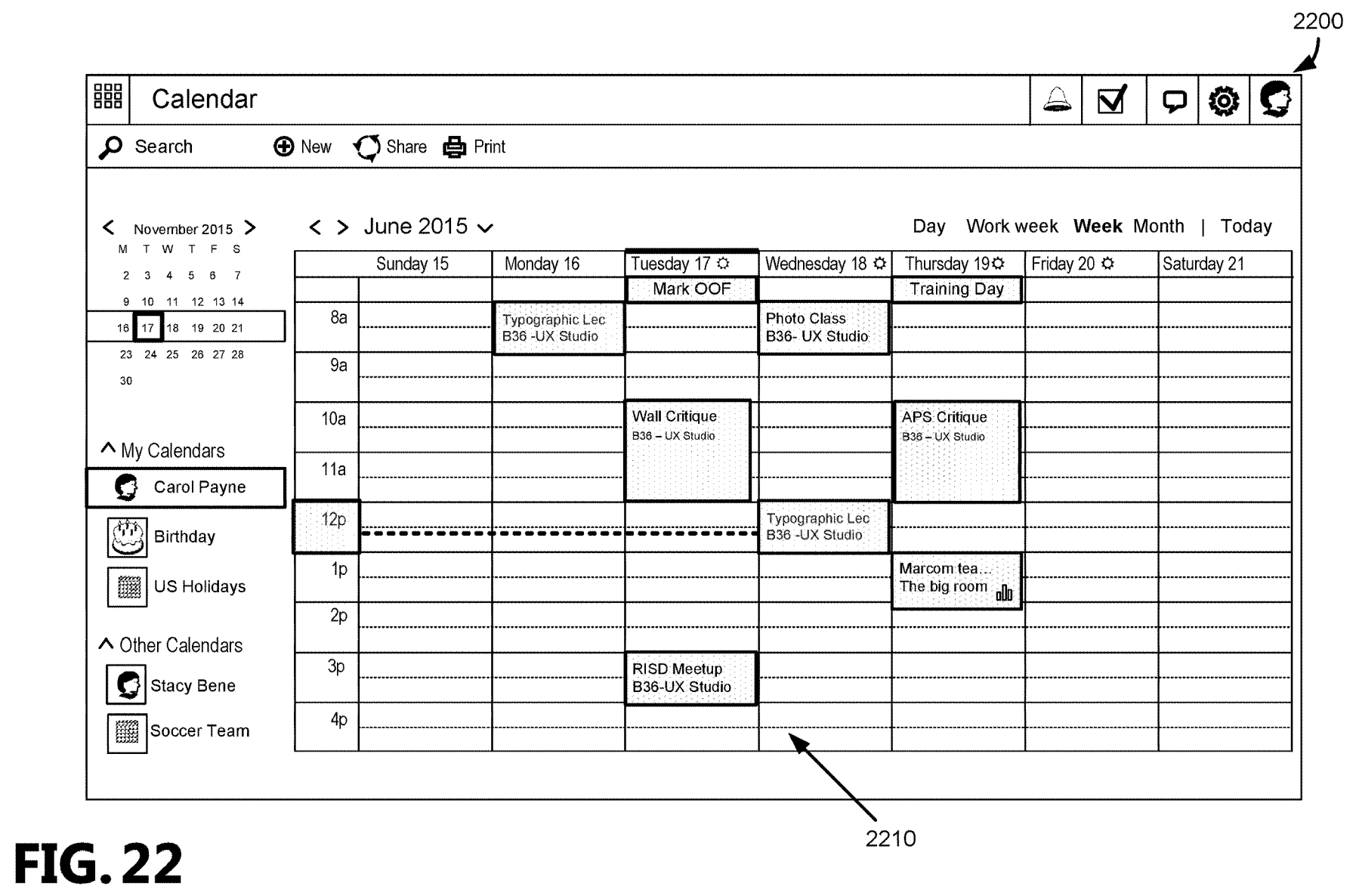

FIG. 22 is an illustration of an example graphical user interface 2200 in which conversational calendar integration is implemented. More specifically, the example graphical user interface 2200 displays a calendar view 2210 illustrating that four of the five proposed meeting requests have been removed from the meeting organizer's calendar. Thus, the calendar item being displayed reflects the "Thu 11/19" meeting time selected in FIG. 21.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 23:
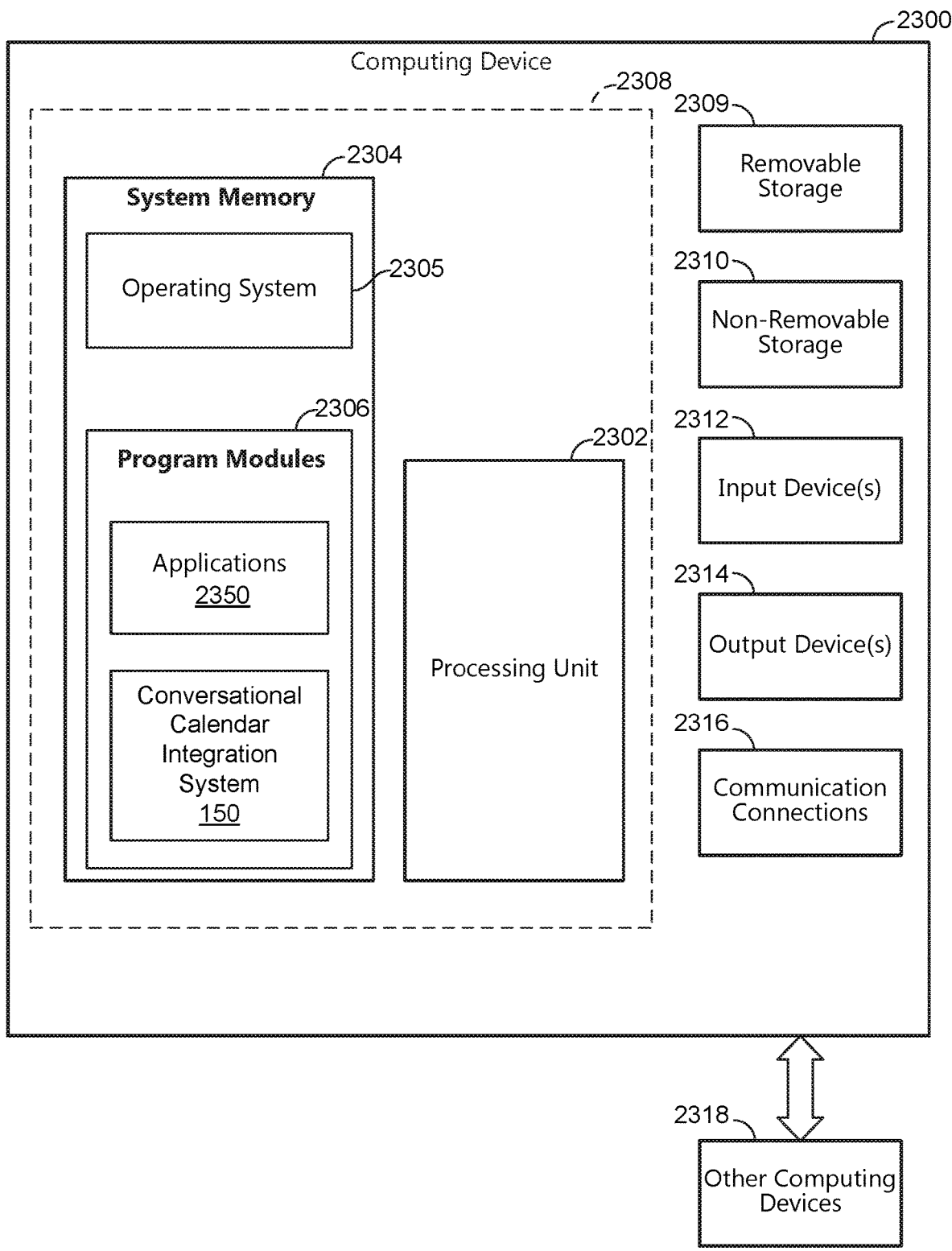
FIG. 23 is a block diagram illustrating example physical components of a computing device.
Figure 24A:
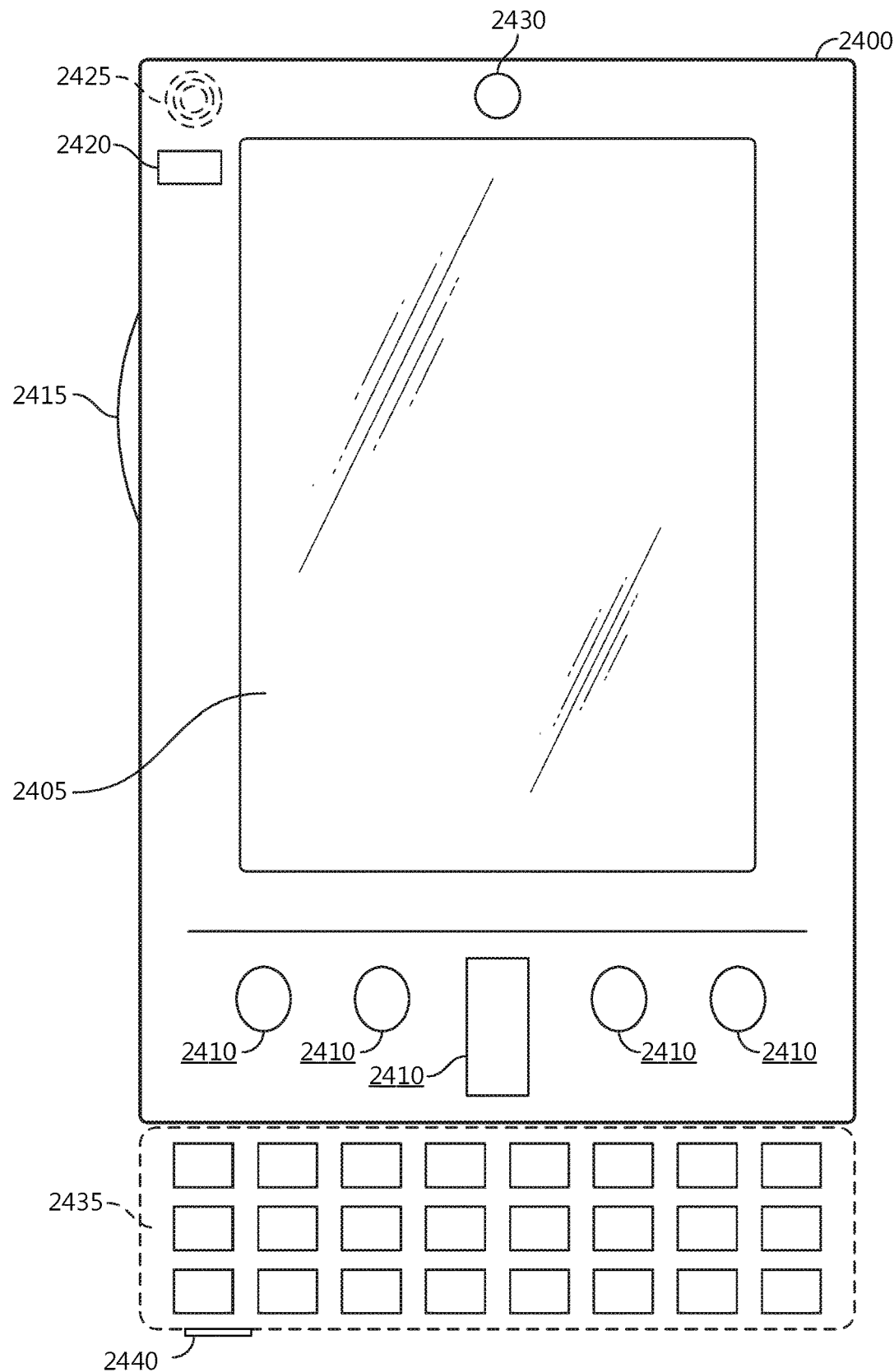
FIGS. 24A and 24B are block diagrams of a mobile computing device.
Figure 24B:
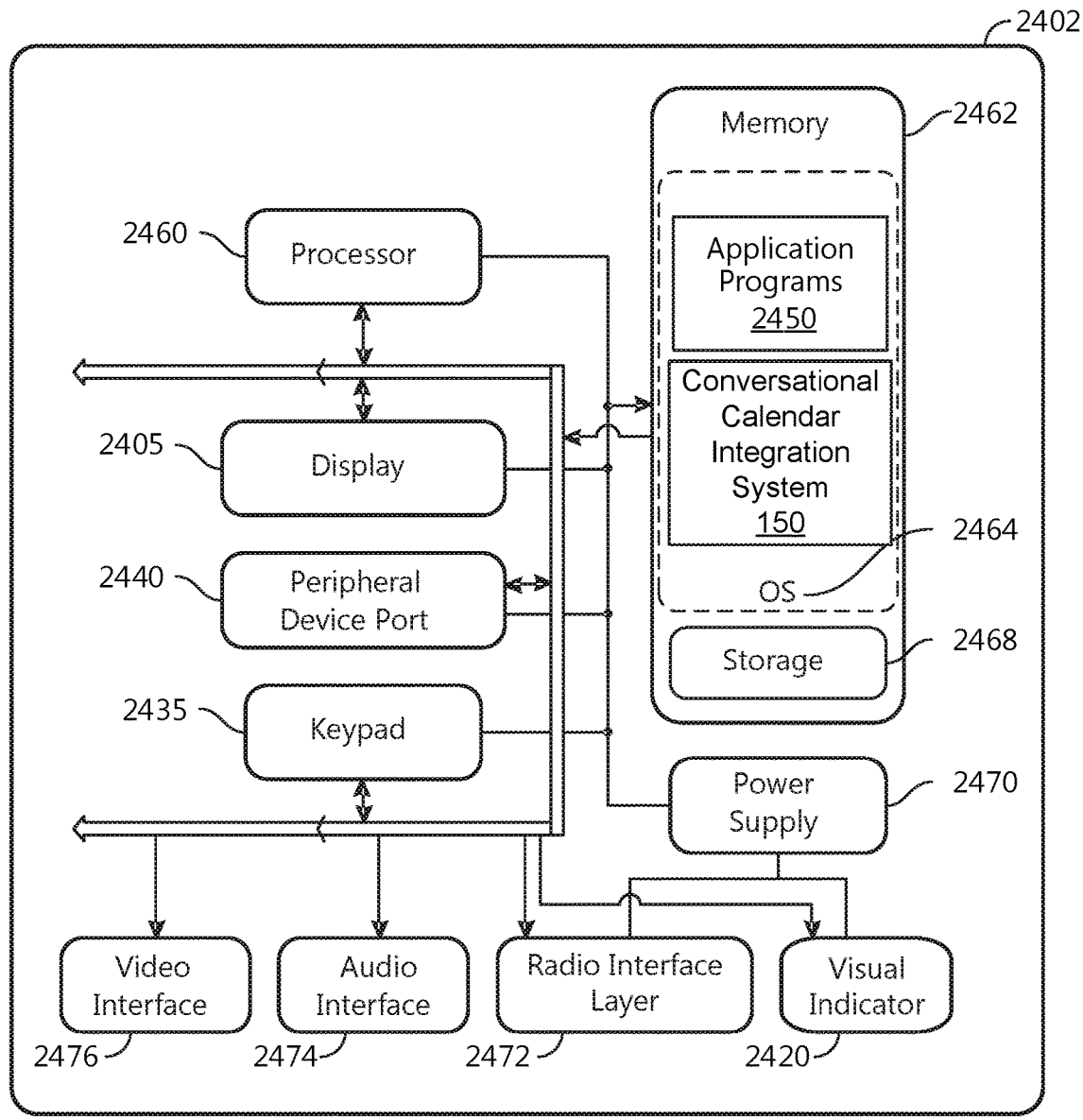
Figure 25:
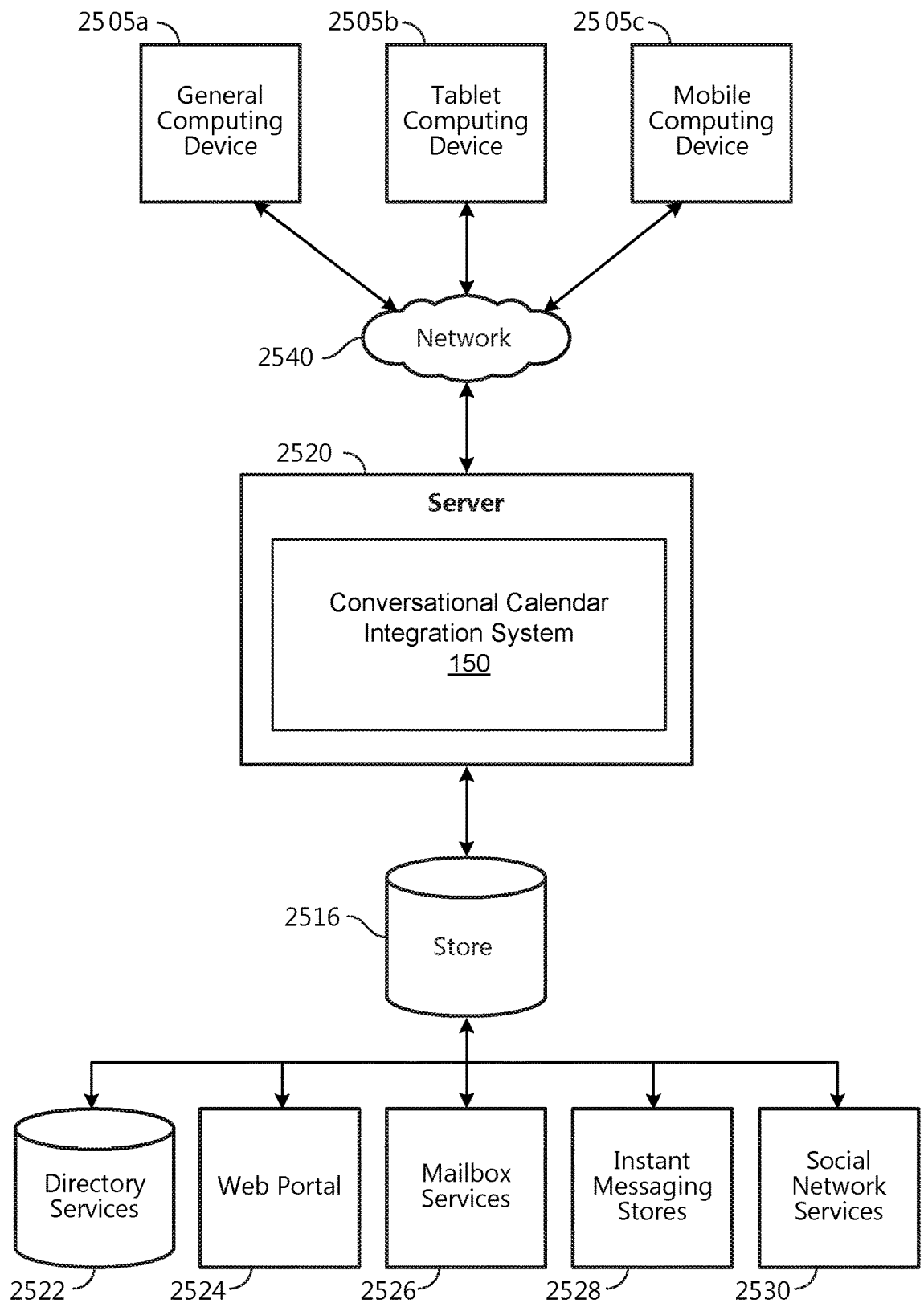
FIG. 25 is a block diagram of a distributed computing system.

FIGS. 23-25 and the associated descriptions provide a discussion of a variety of operating environments in which examples are practiced. However, the devices and systems illustrated and discussed with respect to FIGS. 23-25 are for purposes of example and illustration and are not limiting of a vast number of computing device configurations that are utilized for practicing aspects, described herein.

FIG. 23 is a block diagram illustrating physical components (i.e., hardware) of a computing device 2300 with which examples of the present disclosure may be practiced. In a basic configuration, the computing device 2300 includes at least one processing unit 2302 and a system memory 2304. According to an aspect, depending on the configuration and type of computing device, the system memory 2304 comprises, but is not limited to, volatile storage (e.g., random access memory), non-volatile storage (e.g., read-only memory), flash memory, or any combination of such memories. According to an aspect, the system memory 2304 includes an operating system 2305 and one or more program modules 2306 suitable for running software applications 2350. According to an aspect, the system memory 2304 includes a conversational calendar integration system 150. The operating system 2305, for example, is suitable for controlling the operation of the computing device 2300. Furthermore, aspects are practiced in conjunction with a graphics library, other operating systems, or any other application program, and are not limited to any particular application or system. This basic configuration is illustrated in FIG. 23 by those components within a dashed line 2308. According to an aspect, the computing device 2300 has additional features or functionality. For example, according to an aspect, the computing device 2300 includes additional data storage devices (removable and/or non-removable) such as, for example, magnetic disks, optical disks, or tape. Such additional storage is illustrated in FIG. 23 by a removable storage device 2309 and a non-removable storage device 2310.

As stated above, according to an aspect, a number of program modules and data files are stored in the system memory 2304. While executing on the processing unit 2302, the program modules 2306 (e.g., a conversational calendar integration system 150) perform processes including, but not limited to, one or more of the stages of the methods 200 and 300 illustrated in FIGS. 2 and 3. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, aspects are practiced in an electrical circuit comprising discrete electronic elements, packaged or integrated electronic chips containing logic gates, a circuit utilizing a microprocessor, or on a single chip containing electronic elements or microprocessors. For example, aspects are practiced via a system-on-a-chip (SOC) where each or many of the components illustrated in FIG. 23 are integrated onto a single integrated circuit. According to an aspect, such an SOC device includes one or more processing units, graphics units, communications units, system virtualization units and various application functionality all of which are integrated (or "burned") onto the chip substrate as a single integrated circuit. When operating via an SOC, the functionality, described herein, is operated via application-specific logic integrated with other components of the computing device 2300 on the single integrated circuit (chip). According to an aspect, aspects of the present disclosure are practiced using other technologies capable of performing logical operations such as, for example, AND, OR, and NOT, including but not limited to mechanical, optical, fluidic, and quantum technologies. In addition, aspects are practiced within a general purpose computer or in any other circuits or systems.

According to an aspect, the computing device 2300 has one or more input device(s) 2312 such as a keyboard, a mouse, a pen, a sound input device, a touch input device, etc. The output device(s) 2314 such as a display, speakers, a printer, etc. are also included according to an aspect. The aforementioned devices are examples and others may be used. According to an aspect, the computing device 2300 includes one or more communication connections 2316 allowing communications with other computing devices 2318. Examples of suitable communication connections 2316 include, but are not limited to, radio frequency (RF) transmitter, receiver, and/or transceiver circuitry; universal serial bus (USB), parallel, and/or serial ports.

The term computer readable media, as used herein, includes computer storage media. Computer storage media include volatile and nonvolatile, removable and non-removable media implemented in any method or technology for storage of information, such as computer readable instructions, data structures, or program modules. The system memory 2304, the removable storage device 2309, and the non-removable storage device 2310 are all computer storage media examples (i.e., memory storage.) According to an aspect, computer storage media include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 2300. According to an aspect, any such computer storage media is part of the computing device 2300. Computer storage media do not include a carrier wave or other propagated data signal.

According to an aspect, communication media are embodied by computer readable instructions, data structures, program modules, or other data in a modulated data signal, such as a carrier wave or other transport mechanism, and include any information delivery media. According to an aspect, the term "modulated data signal" describes a signal that has one or more characteristics set or changed in such a manner as to encode information in the signal. By way of example, and not limitation, communication media include wired media such as a wired network or direct-wired connection, and wireless media such as acoustic, radio frequency (RF), infrared, and other wireless media.

FIGS. 24A and 24B illustrate a mobile computing device 2400, for example, a mobile telephone, a smart phone, a tablet personal computer, a laptop computer, and the like, with which aspects may be practiced. With reference to FIG. 24A, an example of a mobile computing device 2400 for implementing the aspects is illustrated. In a basic configuration, the mobile computing device 2400 is a handheld computer having both input elements and output elements. The mobile computing device 2400 typically includes a display 2405 and one or more input buttons 2410 that allow the user to enter information into the mobile computing device 2400. According to an aspect, the display 2405 of the mobile computing device 2400 functions as an input device (e.g., a touch screen display). If included, an optional side input element 2415 allows further user input. According to an aspect, the side input element 2415 is a rotary switch, a button, or any other type of manual input element. In alternative examples, mobile computing device 2400 incorporates more or fewer input elements. For example, the display 2405 may not be a touch screen in some examples. In alternative examples, the mobile computing device 2400 is a portable phone system, such as a cellular phone. According to an aspect, the mobile computing device 2400 includes an optional keypad 2435. According to an aspect, the optional keypad 2435 is a physical keypad. According to another aspect, the optional keypad 2435 is a "soft" keypad generated on the touch screen display. In various aspects, the output elements include the display 2405 for showing a graphical user interface (GUI), a visual indicator 2420 (e.g., a light emitting diode), and/or an audio transducer 2425 (e.g., a speaker). In some examples, the mobile computing device 2400 incorporates a vibration transducer for providing the user with tactile feedback. In yet another example, the mobile computing device 2400 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 2400 incorporates peripheral device port 2440, such as an audio input (e.g., a microphone jack), an audio output (e.g., a headphone jack), and a video output (e.g., a HDMI port) for sending signals to or receiving signals from an external device.

FIG. 24B is a block diagram illustrating the architecture of one example of a mobile computing device. That is, the mobile computing device 2400 incorporates a system (i.e., an architecture) 2402 to implement some examples. In one example, the system 2402 is implemented as a "smart phone" capable of running one or more applications (e.g., browser, e-mail, calendaring, contact managers, messaging clients, games, and media clients/players). In some examples, the system 2402 is integrated as a computing device, such as an integrated personal digital assistant (PDA) and wireless phone.

According to an aspect, one or more application programs 2450 are loaded into the memory 2462 and run on or in association with the operating system 2464. Examples of the application programs include phone dialer programs, e-mail programs, personal information management (PIM) programs, word processing programs, spreadsheet programs, Internet browser programs, messaging programs, and so forth. According to an aspect, a conversational calendar integration system 150 is loaded into memory 2462. The system 2402 also includes a non-volatile storage area 2468 within the memory 2462. The non-volatile storage area 2468 is used to store persistent information that should not be lost if the system 2402 is powered down. The application programs 2450 may use and store information in the non-volatile storage area 2468, such as e-mail or other messages used by an e-mail application, and the like. A synchronization application (not shown) also resides on the system 2402 and is programmed to interact with a corresponding synchronization application resident on a host computer to keep the information stored in the non-volatile storage area 2468 synchronized with corresponding information stored at the host computer. As should be appreciated, other applications may be loaded into the memory 2462 and run on the mobile computing device 2400.

According to an aspect, the system 2402 has a power supply 2470, which is implemented as one or more batteries. According to an aspect, the power supply 2470 further includes an external power source, such as an AC adapter or a powered docking cradle that supplements or recharges the batteries.

According to an aspect, the system 2402 includes a radio 2472 that performs the function of transmitting and receiving radio frequency communications. The radio 2472 facilitates wireless connectivity between the system 2402 and the "outside world," via a communications carrier or service provider. Transmissions to and from the radio 2472 are conducted under control of the operating system 2464. In other words, communications received by the radio 2472 may be disseminated to the application programs 2450 via the operating system 2464, and vice versa.

According to an aspect, the visual indicator 2420 is used to provide visual notifications and/or an audio interface 2474 is used for producing audible notifications via the audio transducer 2425. In the illustrated example, the visual indicator 2420 is a light emitting diode (LED) and the audio transducer 2425 is a speaker. These devices may be directly coupled to the power supply 2470 so that when activated, they remain on for a duration dictated by the notification mechanism even though the processor 2460 and other components might shut down for conserving battery power. The LED may be programmed to remain on indefinitely until the user takes action to indicate the powered-on status of the device. The audio interface 2474 is used to provide audible signals to and receive audible signals from the user. For example, in addition to being coupled to the audio transducer 2425, the audio interface 2474 may also be coupled to a microphone to receive audible input, such as to facilitate a telephone conversation. According to an aspect, the system 2402 further includes a video interface 2476 that enables an operation of an on-board camera 2430 to record still images, video stream, and the like.

According to an aspect, a mobile computing device 2400 implementing the system 2402 has additional features or functionality. For example, the mobile computing device 2400 includes additional data storage devices (removable and/or non-removable) such as, magnetic disks, optical disks, or tape. Such additional storage is illustrated in FIG. 24B by the non-volatile storage area 2468.

According to an aspect, data/information generated or captured by the mobile computing device 2400 and stored via the system 2402 are stored locally on the mobile computing device 2400, as described above. According to another aspect, the data are stored on any number of storage media that are accessible by the device via the radio 2472 or via a wired connection between the mobile computing device 2400 and a separate computing device associated with the mobile computing device 2400, for example, a server computer in a distributed computing network, such as the Internet. As should be appreciated such data/information are accessible via the mobile computing device 2400 via the radio 2472 or via a distributed computing network. Similarly, according to an aspect, such data/information are readily transferred between computing devices for storage and use according to well-known data/information transfer and storage means, including electronic mail and collaborative data/information sharing systems.

FIG. 25 illustrates one example of the architecture of a system for providing conversational calendar integration as described above. Content developed, interacted with, or edited in association with the conversational calendar integration system 150 is enabled to be stored in different communication channels or other storage types. For example, various documents may be stored using a directory service 2522, a web portal 2524, a mailbox service 2526, an instant messaging store 2528, or a social networking site 2530. The conversational calendar integration system 150 is operative to use any of these types of systems or the like for providing conversational calendar integration, as described herein. According to an aspect, a server 2520 provides the conversational calendar integration system 150 to clients 2505*a,b,c*. As one example, the server 2520 is a web server providing the conversational calendar integration system 150 over the web. The server 2520 provides the conversational calendar integration system 150 over the web to clients 2505 through a network 2540. By way of example, the client computing device is implemented and embodied in a personal computer 2505*a*, a tablet computing device 2505*b* or a mobile computing device 2505*c* (e.g., a smart phone), or other computing device. Any of these examples of the client computing device are operable to obtain content from the store 2516.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

I claim:

1. A method for providing multiple proposed meeting request times for a meeting, comprising:
   enabling display of a meeting request user interface for creating a meeting request, wherein the meeting request pertains to the meeting;
   receiving a selection of one or more attendees for the meeting;
   receiving a plurality of proposed meeting times for the meeting;
   enabling display, within the meeting request user interface, of the plurality of proposed meeting times as optional times for the meeting and the selection of one or more attendees for the meeting and an organizer's calendar;
   enabling display of availability of the one or more attendees in relationship to the plurality of proposed meeting times for the meeting;
   sending the meeting request to each of the one or more attendees, wherein the meeting request comprises the plurality of proposed meeting times for selection by the one or more attendees; and
   receiving at least one response from at least one of the one or more attendees, wherein the at least one response identifies at least one of the plurality of proposed meeting times for the meeting.

2. The method of claim 1, further comprising displaying the meeting request user interface including at least one response from at least one of the one or more attendees.

3. The method of claim 2, wherein displaying the meeting request user interface including at the least one response from at least one of the one or more attendees further comprises displaying a user interface element for each proposed meeting time of the plurality of proposed meeting times, wherein each user interface element displays a number of responses from at least one of the one or more attendees that accepted the proposed meeting time.

4. The method of claim 3, further comprising receiving a selection of the user interface element associated with a proposed meeting time, thereby establishing a selected meeting time.

5. The method of claim 2, wherein displaying the meeting request user interface including the at least one response from at least one of the one or more attendees further comprises displaying a user interface element for identifying each of the one or more attendees.

6. The method of claim 5, wherein the user interface element for identifying each of the one or more attendees further comprises providing an indication whether at least one of the one or more attendees responded.

7. The method of claim 5, wherein the user interface element for identifying each of the one or more attendees further comprises providing an indication whether at least one of the one or more attendees has declined all of the plurality of proposed meeting times.

8. The method of claim 4, further comprising sending an update to the meeting request with the selected meeting time.

9. A system for providing multiple proposed meeting request times for a meeting, comprising:
   a processing unit; and
   a memory including instructions, which when executed by the processing unit, causes the system to:
      enable display of a meeting request user interface for creating a meeting request, wherein the meeting request pertains to the meeting;
      receive a selection of one or more attendees for the meeting;
      receive a plurality of proposed meeting times for the meeting;
      enable display, in an organizer's calendar, of an indication of availability of the one or more attendees in relationship to the plurality of proposed meeting times as optional times for the meeting;
      send the meeting request to each of the one or more attendees, wherein the meeting request comprises the plurality of the propose meeting times for selection by the one or more attendees;
      receive at least one response from at least one of the one or more attendees, wherein the at least one response identifies at least one of the plurality of proposed meeting times for the meeting;
      enable display of the meeting request user interface including the at least one response from the one or more attendees;
      receive a selection of one of the plurality of proposed meeting times for the meeting; and
      send an update to each of the one or more attendees with the selected meeting time for the meeting.

10. The method of claim 9, wherein to display the meeting request user interface including the at east one response from the one or more attendees further comprises to display a user interface element for each proposed meeting time of the plurality of proposed meeting times, wherein each user interface element displays a number of responses from the one or more attendees that accepted the proposed meeting time.

11. The method of claim 9, wherein to display the meeting request user interface including the at least one response from the one or more attendees further comprises to display a user interface element for identifying whether each of the one or more attendees responded.

12. A method for providing conversational calendar integration, comprising:
   receiving a meeting request including multiple proposed meeting times for selection by attendees;
   receiving a selection to open the meeting request;
   enabling display of an attendee's calendar within the meeting request, wherein the attendee's calendar is configured to dynamically display availability of the attendee in relation to the multiple proposed meeting times;
   receiving at least one response to the multiple proposed meeting times as a selection for the meeting from the attendee, wherein the at least one response identifies at least one of the multiple proposed meeting times for the meeting; and
   sending, to an organizer of the meeting request, the at least one response to the multiple proposed meeting times for the meeting.

13. The method of claim 12, wherein the attendee's calendar includes other calendar entries.

14. The method of claim 12, wherein the meeting request includes an option for declining all of the multiple proposed meeting times.

15. The method of claim 12, wherein the meeting request includes an option for providing a comment.

16. The method of claim 12, wherein each proposed meeting time of the multiple proposed meeting times is configured to receive an attendee response to accept or decline the proposed meeting time.

17. The method of claim 12, further comprising integrating each of the multiple proposed meeting times into the attendee's calendar.

18. The method of claim 17, wherein the multiple proposed meeting times in the attendee's calendar further comprises displaying an indication that a calendar item is associated with the meeting request.

19. The method of claim 17, wherein the multiple proposed meeting times in the attendee's calendar further comprises functionality to receive an attendee response to accept or decline the proposed meeting time.

20. The method of claim 12, further comprising displaying a checkbox to receive an attendee response to accept one of the multiple proposed meeting times.

\* \* \* \* \*